US010743332B2

(12) United States Patent
Luo et al.

(10) Patent No.: US 10,743,332 B2
(45) Date of Patent: Aug. 11, 2020

(54) TECHNIQUES AND APPARATUSES FOR COMPLEMENTARY TRANSMISSION RELATING TO AN INTERRUPTED TRAFFIC FLOW IN NEW RADIO

(71) Applicant: QUALCOMM Incorporated, San Diego, CA (US)

(72) Inventors: Tao Luo, San Diego, CA (US); Junyi Li, Chester, NJ (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 15/815,172

(22) Filed: Nov. 16, 2017

(65) Prior Publication Data

US 2018/0146492 A1 May 24, 2018

Related U.S. Application Data

(60) Provisional application No. 62/424,252, filed on Nov. 18, 2016.

(51) Int. Cl.
*H04W 72/12* (2009.01)
*H04L 5/00* (2006.01)
(Continued)

(52) U.S. Cl.
CPC ....... *H04W 72/1242* (2013.01); *H04L 5/0035* (2013.01); *H04L 5/0044* (2013.01);
(Continued)

(58) Field of Classification Search
CPC ... H04L 1/1812; H04L 5/0035; H04L 5/0044; H04L 5/0078; H04L 5/0091;
(Continued)

(56) References Cited

U.S. PATENT DOCUMENTS 6,816,500 B1 * 11/2004 Mannette ................ H04L 47/24
370/337
6,925,054 B1 * 8/2005 Atterton .............. H04L 12/4604
370/218

(Continued)

OTHER PUBLICATIONS

International Search Report and Written Opinion—PCT/US2017/062236—ISA/EPO—dated Feb. 16, 2018.

(Continued)

*Primary Examiner* — Robert J Lopata
(74) *Attorney, Agent, or Firm* — Harrity & Harrity, LLP/Qualcomm

(57) ABSTRACT

A method, an apparatus, and a computer program product for wireless communication are provided. An apparatus may obtain information indicating that a portion of a first traffic flow to be transmitted on a first link is to be interrupted by a second traffic flow to be transmitted on the first link. The apparatus may transmit information associated with the portion of the first traffic flow on a second link. An apparatus may receive a first traffic flow on a first link and information associated with a portion of the first traffic flow on a second link, wherein the information associated with the portion of the first traffic flow indicates that the portion of the first traffic flow may be interrupted by a second traffic flow. The apparatus may selectively process the first link based on the information associated with the portion of the first traffic flow.

30 Claims, 16 Drawing Sheets

(51) Int. Cl.
*H04W 72/10* (2009.01)
*H04L 1/18* (2006.01)
(52) U.S. Cl.
CPC .......... *H04L 5/0078* (2013.01); *H04L 5/0091*
(2013.01); *H04W 72/10* (2013.01); ***H04W
72/1252* (2013.01); *H04W 72/1268*** (2013.01);
*H04L 1/1812* (2013.01)
(58) Field of Classification Search
CPC ............. H04W 72/10; H04W 72/1242; H04W 72/1252; H04W 72/1268
USPC ........................................................ 370/329
See application file for complete search history.

(56) References Cited

U.S. PATENT DOCUMENTS

| | | | | |
|---|---|---|---|---|
| 7,835,272 | B1* | 11/2010 | Johnson | H04L 41/0668 370/228 |
| 8,023,490 | B2* | 9/2011 | Gessner | H04W 72/1242 370/328 |
| 8,553,541 | B2* | 10/2013 | Mihaly | H04L 12/5692 370/230 |
| 2002/0041595 | A1* | 4/2002 | Delvaux | H04L 47/10 370/392 |
| 2002/0059432 | A1* | 5/2002 | Masuda | H04L 47/2408 709/227 |
| 2004/0076166 | A1* | 4/2004 | Patenaude | H04J 3/1611 370/401 |
| 2004/0076168 | A1* | 4/2004 | Patenaude | H04J 3/1611 370/406 |
| 2004/0146022 | A1* | 7/2004 | Lewis | G01S 7/021 370/331 |
| 2005/0018644 | A1* | 1/2005 | Gessner | H04L 1/1887 370/349 |
| 2008/0084819 | A1* | 4/2008 | Parizhsky | H04L 47/10 370/230 |
| 2008/0205435 | A1* | 8/2008 | Nahumi | H04N 7/17318 370/463 |
| 2008/0253287 | A1* | 10/2008 | Gupta | H04L 47/10 370/235 |
| 2008/0320354 | A1* | 12/2008 | Doppler | H04L 1/04 714/748 |
| 2009/0041039 | A1* | 2/2009 | Bear | H04L 45/38 370/401 |
| 2009/0154358 | A1* | 6/2009 | Kanda | H04L 47/10 370/237 |
| 2009/0249115 | A1* | 10/2009 | Bycroft | H04L 12/462 714/47.1 |
| 2009/0251601 | A1* | 10/2009 | Ihlefeld | H04N 5/0733 348/521 |
| 2011/0110225 | A1* | 5/2011 | Mihaly | H04L 12/5692 370/225 |
| 2011/0131319 | A1* | 6/2011 | Harrang | H04L 47/11 709/224 |
| 2011/0176561 | A1* | 7/2011 | Wenzel | H04J 3/247 370/509 |
| 2012/0163170 | A1* | 6/2012 | Diachina | H04L 47/10 370/231 |
| 2012/0163224 | A1* | 6/2012 | Long | H04L 41/5025 370/252 |
| 2012/0263081 | A1* | 10/2012 | Li | H04B 7/0452 370/310 |
| 2012/0314663 | A1* | 12/2012 | Dwivedi | H04L 1/1816 370/329 |
| 2013/0003754 | A1* | 1/2013 | Blumenroether | G08C 19/00 370/431 |
| 2013/0267236 | A1* | 10/2013 | Huang | H04W 72/10 455/450 |
| 2013/0322348 | A1* | 12/2013 | Julian | H04L 5/003 370/329 |
| 2014/0050087 | A1* | 2/2014 | Pasotti | H04L 47/2441 370/230 |
| 2014/0254565 | A1* | 9/2014 | Pitchaiah | H04L 5/22 370/336 |
| 2015/0016247 | A1* | 1/2015 | Hayes | H04L 47/127 370/230 |
| 2015/0327113 | A1* | 11/2015 | Nishioka | H04W 72/08 370/235 |
| 2015/0334702 | A1* | 11/2015 | Ji | H04W 72/1257 370/280 |
| 2015/0358827 | A1* | 12/2015 | Bendlin | H04W 72/0413 455/454 |
| 2015/0373756 | A1* | 12/2015 | Fujimoto | H04B 1/7143 370/254 |
| 2016/0088521 | A1* | 3/2016 | Ho | H04W 28/08 455/453 |
| 2016/0234857 | A1 | 8/2016 | Chen et al. | |
| 2016/0308755 | A1* | 10/2016 | Garg | H04L 47/122 |
| 2016/0338071 | A1* | 11/2016 | Khosla | H04W 72/1215 |
| 2017/0251486 | A1* | 8/2017 | Hu | H04W 72/1242 |
| 2018/0077068 | A1* | 3/2018 | Dhanabalan | H04L 47/2433 |
| 2018/0183697 | A1* | 6/2018 | Dhesikan | H04L 43/0882 |
| 2019/0190808 | A1* | 6/2019 | Jordan | H04L 47/6265 |

OTHER PUBLICATIONS

Nokia et al., "Punctured Scheduling for Low Latency Transmissions", 3GPP Draft; R1-1609747_Punctured Scheduling_Final, 3rd Generation Partnership Project (3GPP), Mobile Competence Centre, 650, Route Des Lucioles, F-06921, Sophia-Antipolis Cedex, France, vol. RAN WG1, No. Lisbon, Portugal; Oct. 10, 2016-Oct. 14, 2016 Oct. 9, 2016, XP051149780, Retrieved from the Internet: URL:http://www.3gpp.org/ftp/Meetings_3GPP_SYNC/RAN1/Docs/ [retrieved on Oct. 9, 2016], 5 pages.

* cited by examiner

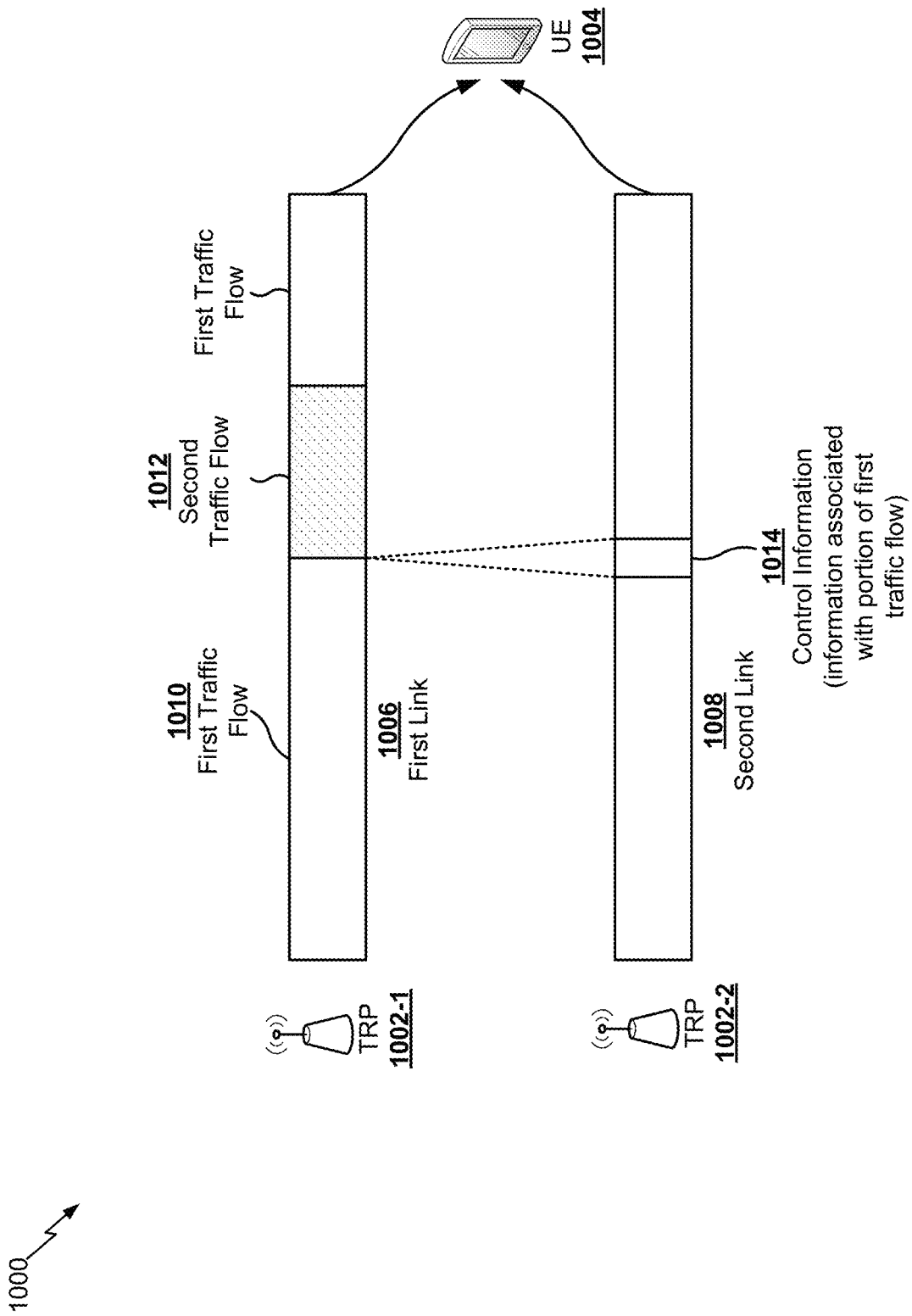

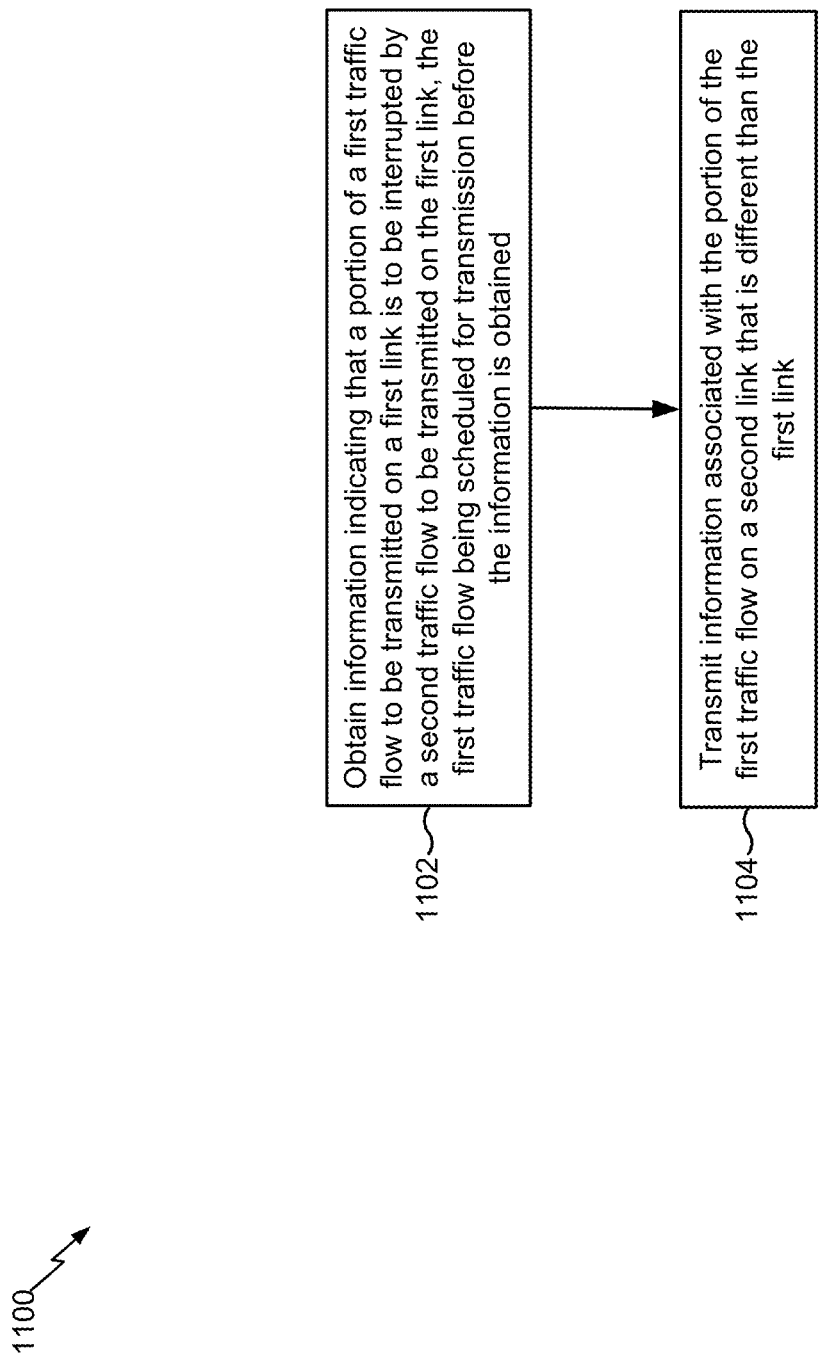

TECHNIQUES AND APPARATUSES FOR COMPLEMENTARY TRANSMISSION RELATING TO AN INTERRUPTED TRAFFIC FLOW IN NEW RADIO

CROSS-REFERENCE TO RELATED APPLICATIONS UNDER 35 U.S.C. § 119

This application claims priority to Provisional Patent Application No. 62/424,252, filed Nov. 18, 2016, entitled "TECHNIQUES AND APPARATUSES FOR COMPLEMENTARY TRANSMISSION RELATING TO AN INTERRUPTED TRAFFIC FLOW IN NEW RADIO," which is hereby expressly incorporated by reference herein.

BACKGROUND

Field

Aspects of the present disclosure generally relate to wireless communication, and more particularly to techniques and apparatuses for complementary transmission relating to an interrupted traffic flow in New Radio.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include obtaining information indicating that a portion of a first traffic flow to be transmitted on a first link is to be interrupted by a second traffic flow to be transmitted on the first link. The first traffic flow may be scheduled for transmission before the information is obtained. The method may include transmitting information associated with the portion of the first traffic flow on a second link that is different than the first link.

In some aspects, the apparatus may include a memory and at least one processor coupled to the memory. The at least one processor may be configured to obtain information indicating that a portion of a first traffic flow to be transmitted on a first link is to be interrupted by a second traffic flow to be transmitted on the first link. The first traffic flow may be scheduled for transmission before the information is obtained. The at least one processor may be configured to transmit information associated with the portion of the first traffic flow on a second link that is different than the first link.

In some aspects, the apparatus may include means for obtaining information indicating that a portion of a first traffic flow to be transmitted on a first link is to be interrupted by a second traffic flow to be transmitted on the first link. The first traffic flow may be scheduled for transmission before the information is obtained. The apparatus may include means for transmitting information associated with the portion of the first traffic flow on a second link that is different than the first link.

In some aspects, the computer program product may include a non-transitory computer-readable medium storing computer executable code. The code may include code for obtaining information indicating that a portion of a first traffic flow to be transmitted on a first link is to be interrupted by a second traffic flow to be transmitted on the first link. The first traffic flow may be scheduled for transmission before the information is obtained. The code may include code for transmitting information associated with the portion of the first traffic flow on a second link that is different than the first link.

In some aspects, the method may include receiving a first traffic flow on a first link and information associated with a portion of the first traffic flow on a second link, wherein the information associated with the portion of the first traffic flow indicates that the portion of the first traffic flow is to be interrupted by a second traffic flow on the first link, and wherein the second traffic flow has lower latency or a higher priority than the first traffic flow. The method may include selectively performing processing related to the first link based at least in part on the information associated with the portion of the first traffic flow.

In some aspects, the apparatus may include a memory and at least one processor coupled to the memory. The at least one processor may be configured to receive a first traffic flow on a first link and information associated with a portion of the first traffic flow on a second link, wherein the information associated with the portion of the first traffic flow indicates that the portion of the first traffic flow is to be interrupted by a second traffic flow on the first link, and wherein the second traffic flow has lower latency or a higher priority than the first traffic flow. The at least one processor may be configured to selectively perform processing related to the first link based at least in part on the information associated with the portion of the first traffic flow.

In some aspects, the apparatus may include means for receiving a first traffic flow on a first link and information associated with a portion of the first traffic flow on a second link, wherein the information associated with the portion of the first traffic flow indicates that the portion of the first traffic flow is to be interrupted by a second traffic flow on the first link, and wherein the second traffic flow has lower latency or a higher priority than the first traffic flow. The apparatus may include means for selectively performing processing related to the first link based at least in part on the information associated with the portion of the first traffic flow.

In some aspects, the computer program product may include a non-transitory computer-readable medium storing computer executable code. The code may include code for receiving a first traffic flow on a first link and information associated with a portion of the first traffic flow on a second link, wherein the information associated with the portion of the first traffic flow indicates that the portion of the first traffic flow is to be interrupted by a second traffic flow on the first link, and wherein the second traffic flow has lower latency or a higher priority than the first traffic flow. The code may include code for selectively performing processing related to the first link based at least in part on the information associated with the portion of the first traffic flow.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 10A and 10B are diagrams illustrating examples of complementary transmission relating to an interrupted traffic flow in New Radio.

FIG. 11 is a flow chart of a method of wireless communication.

DETAILED DESCRIPTION

Figure 1:
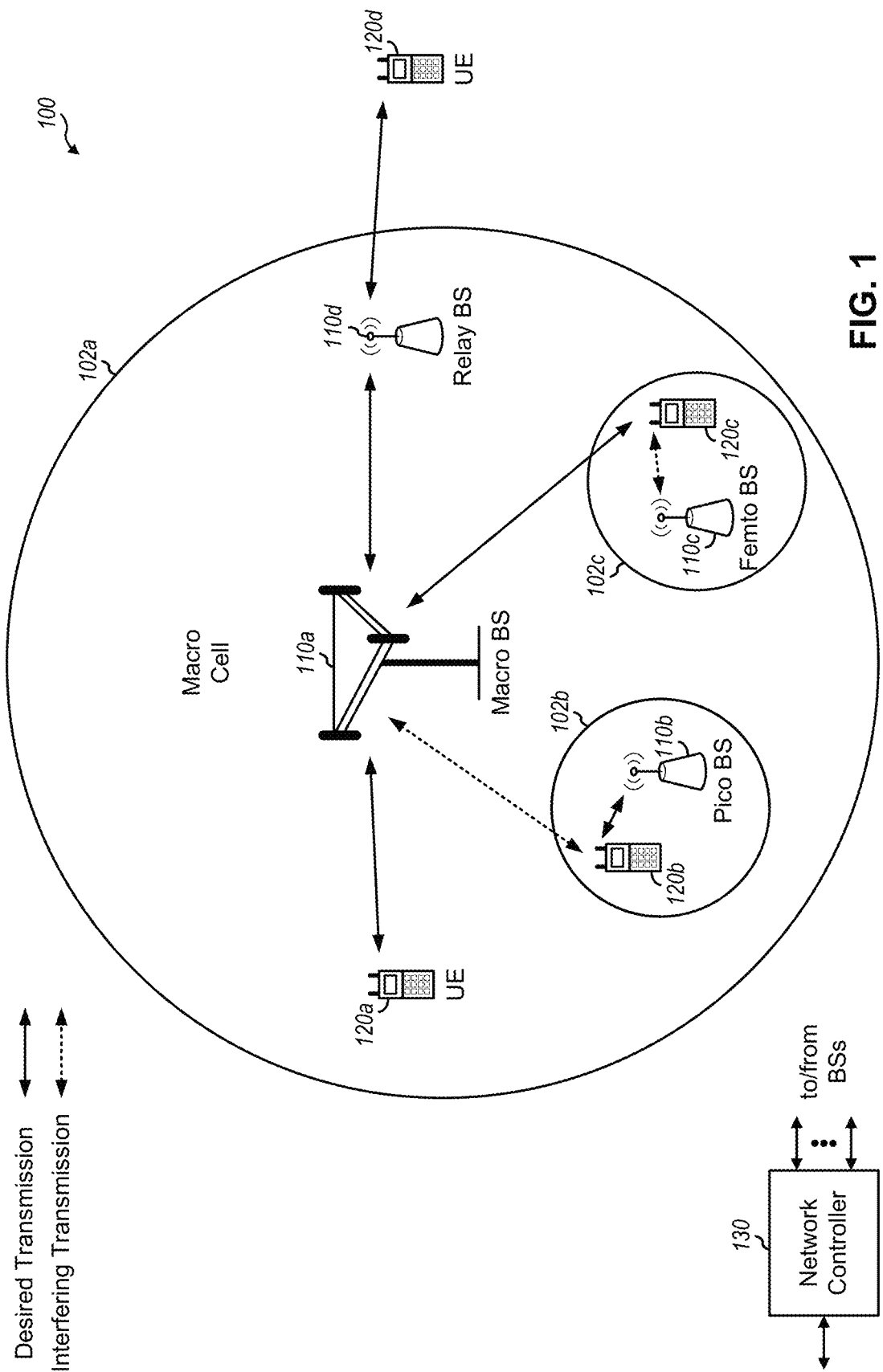
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point (AP) may comprise, be implemented as, or known as a NodeB, a Radio Network Controller (RNC), an eNodeB (eNB), a Base Station Controller (BSC), a Base Transceiver Station (BTS), a Base Station (BS), a Transceiver Function (TF), a Radio Router, a Radio Transceiver, a Basic Service Set (BSS), an Extended Service Set (ESS), a Radio Base Station (RBS), a Node B (NB), a gNB, a 5G NB, a NR BS, a Transmit Receive Point (TRP), or some other terminology.

An access terminal (AT) may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol (SIP) phone, a wireless local loop (WLL) station, a personal digital assistant (PDA), a tablet, a netbook, a smartbook, an ultrabook, a handheld device having wireless connection capability, a Station (STA), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
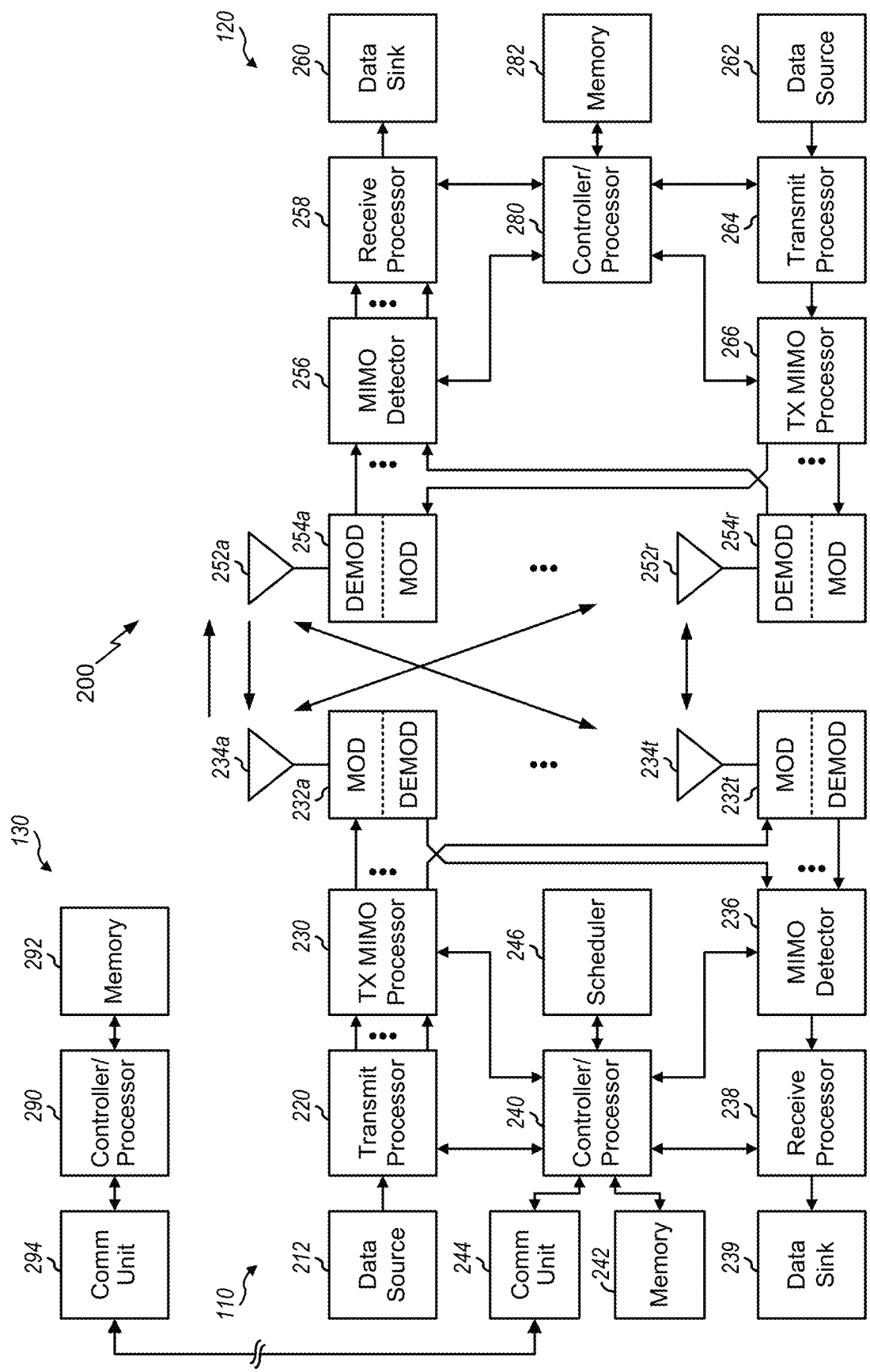
FIG. 2 is a diagram illustrating an example of a base station in communication with a user equipment (UE) in a wireless communication network.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to configure a common uplink portion of a wireless communication structure in New Radio. For example, controller/processor 280 and/or other processors and modules at BS 110, may perform or direct operations of UE 120 to configure a common uplink portion of a wireless communication structure in New Radio. For example, controller/processor 280 and/or other controllers/processors and modules at BS 110 may perform or direct operations of, for example, process 1200 of FIG. 12 and/or other processes as described herein. In some aspects, one or more of the components shown in FIG. 2 may be employed to perform example process 1200 of FIG. 12 and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
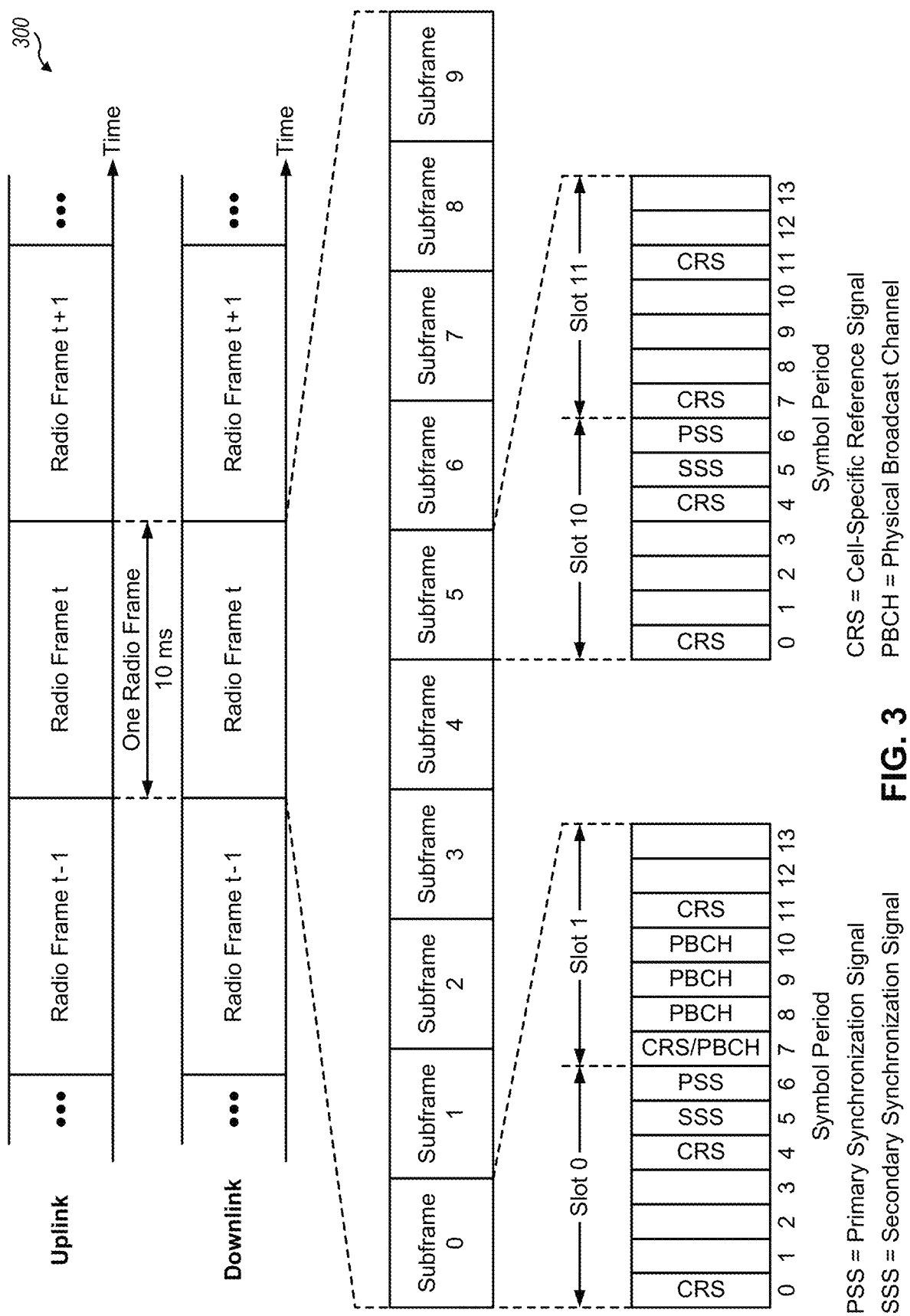
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
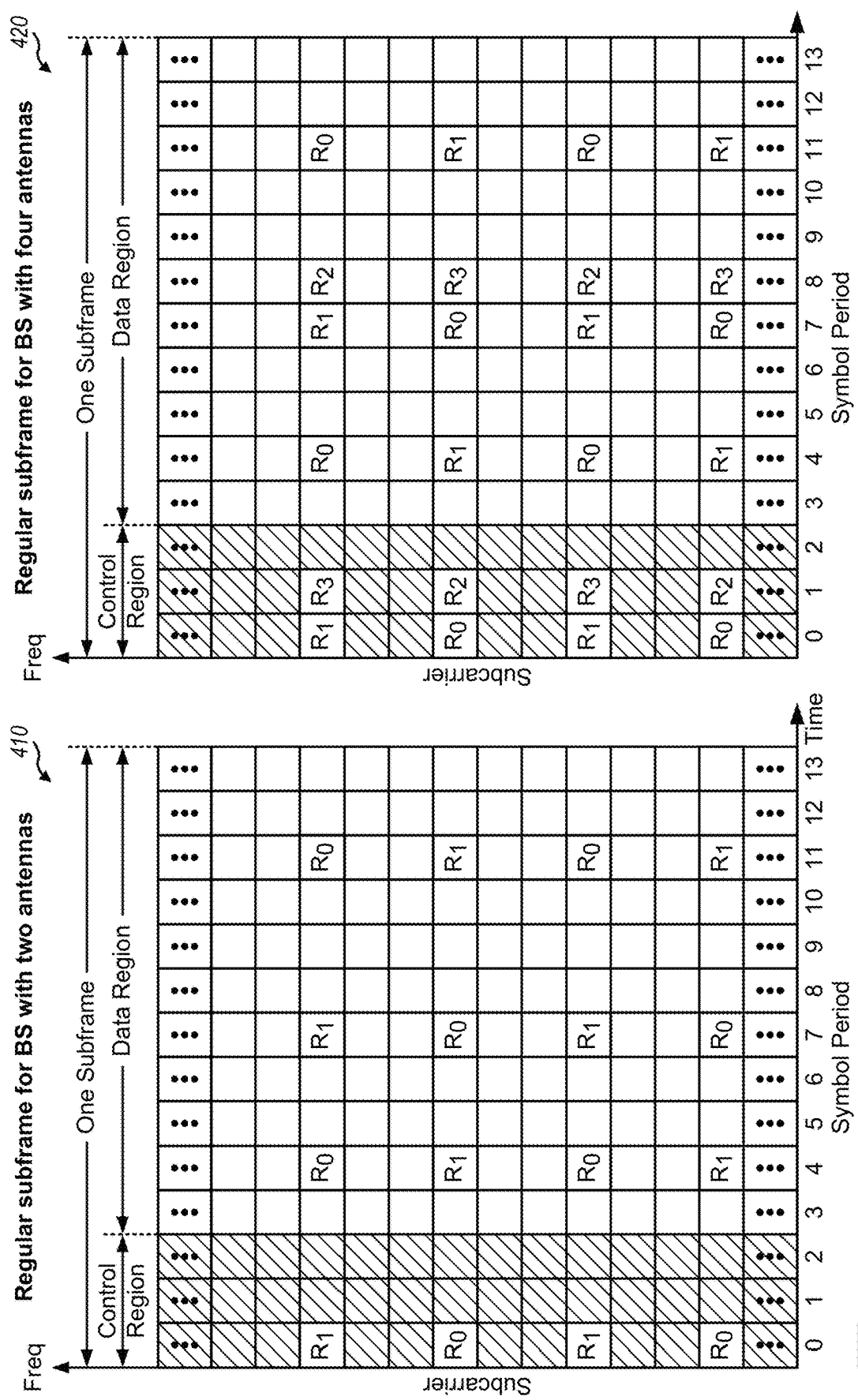
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 subcarriers with a subcarrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals (SS)—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
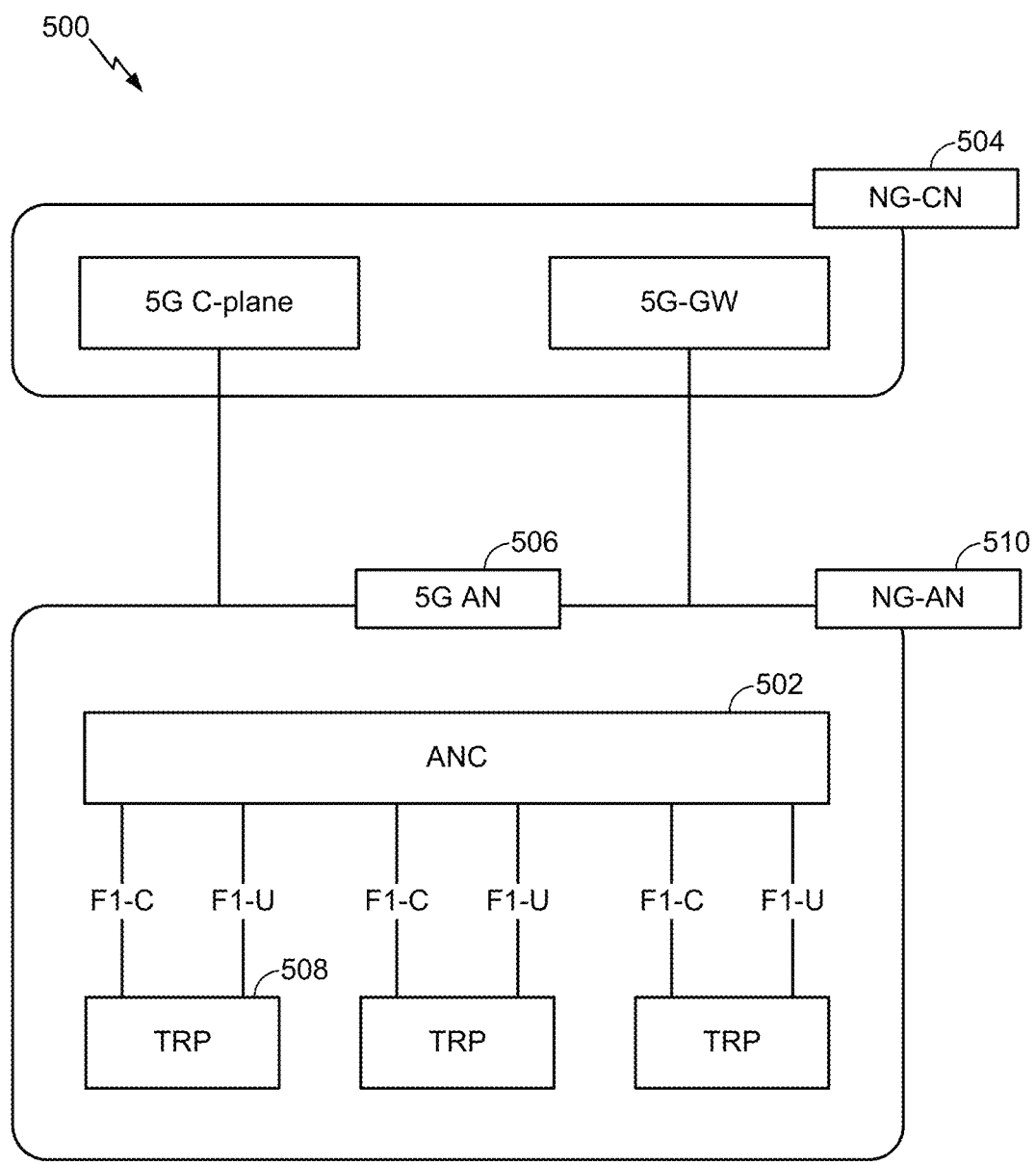
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
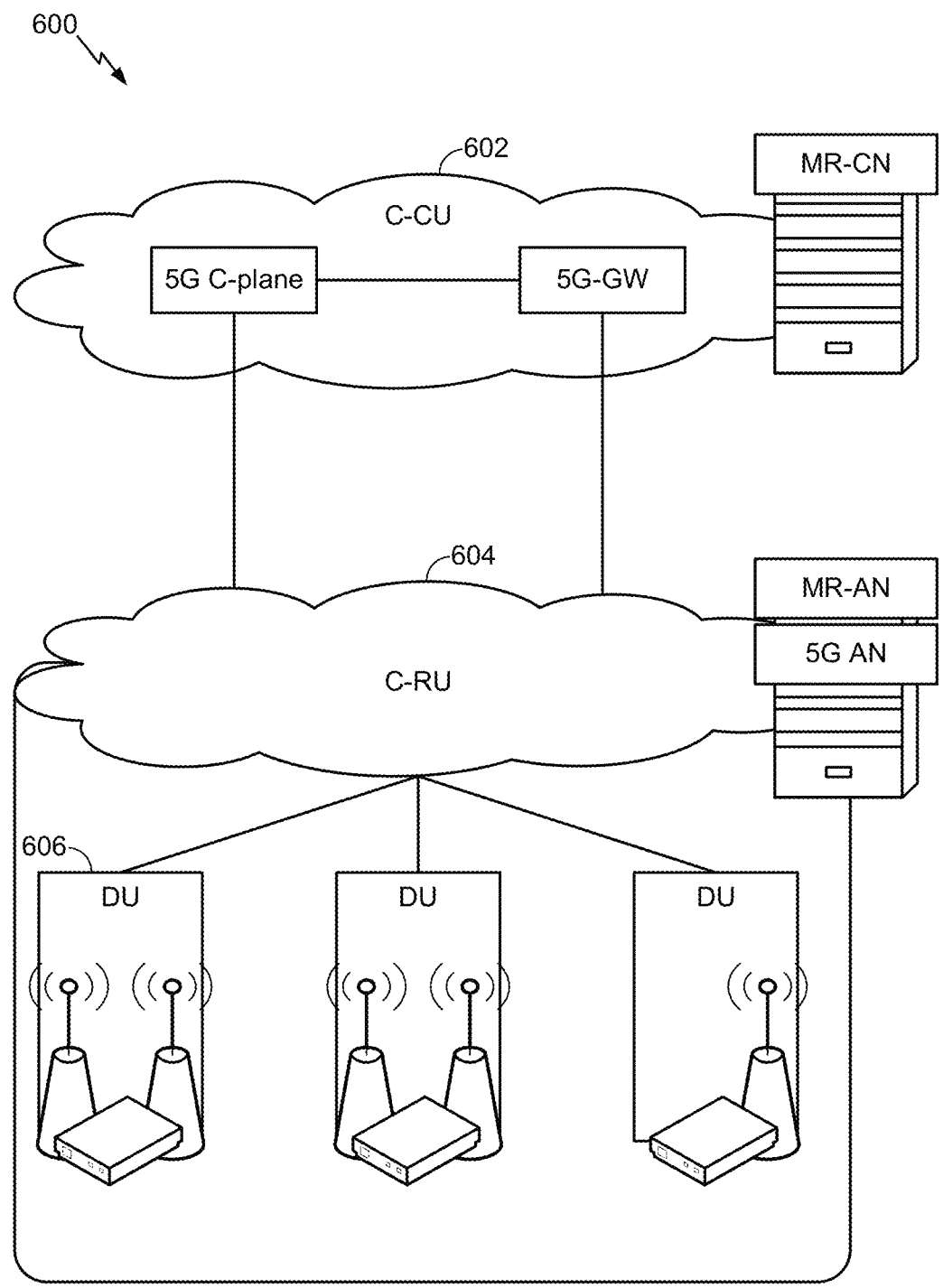
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
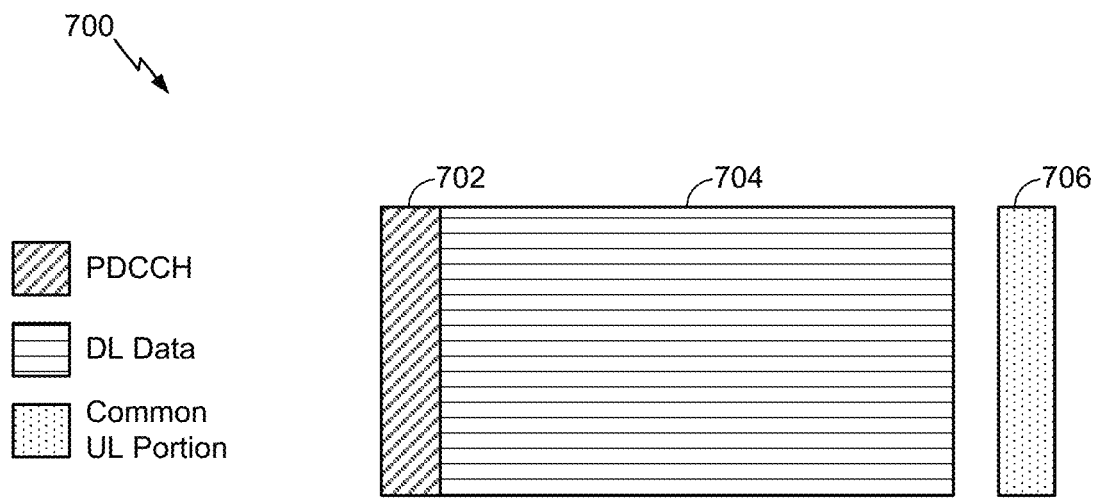
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as a short UL duration, a short UL duration portion, an UL burst, an UL burst portion, a common UL burst, a short burst, an UL short burst, a common UL short burst, a common UL short burst portion, and/or various other suitable terms. In some aspects, the common UL portion 706 may include one or more reference signals. Additionally, or alternatively, the common UL portion 706 may include feedback information corresponding to various other portions of the DL-centric subframe. For example, the common UL portion 706 may include feedback information corresponding to the control portion 702 and/or the data portion 704. Non-limiting examples of information that may be included in the common UL portion 706 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The common UL portion 706 may include additional or alternative information, such as information pertaining to random access channel (RACH) procedures, scheduling requests, and various other suitable types of information. Techniques described herein relate to configuring the common UL portion 706 of a wireless communication structure, such as a DL-centric subframe.

As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
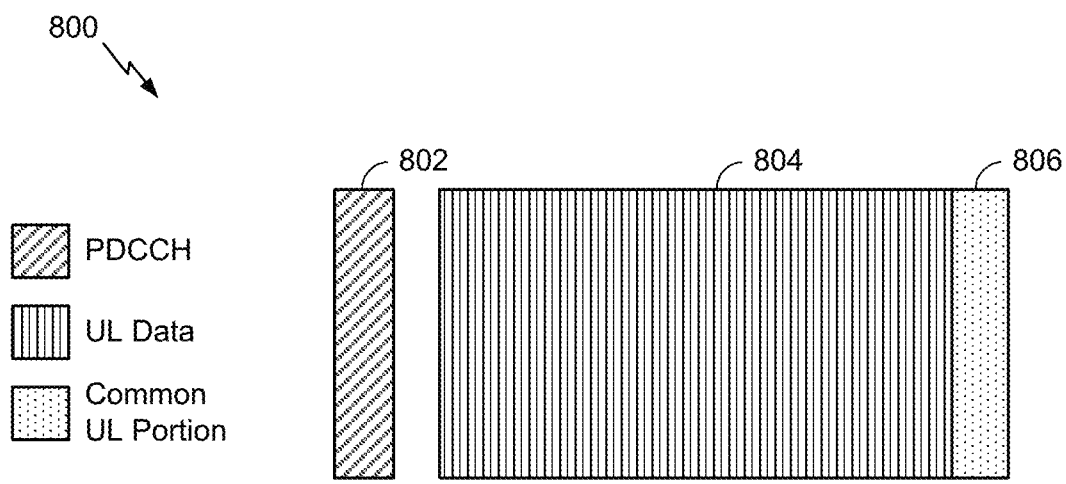
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include a common UL portion 806. The common UL portion 806 in FIG. 8 may be similar to the common UL portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A receiver device (e.g., the UE 120 of FIG. 1, and/or the like) may be connected with multiple transmission devices (e.g., the BS 110 of FIG. 1, the TRPs 508 of FIG. 5, the UE 120 of FIG. 1, and/or another such device capable of transmitting a traffic flow) via one or more frequencies. Traffic (e.g., control messaging, data, Layer 1 signals, and/or the like) may be communicated between the receiver device and the transmission devices over two or more links (e.g., transport blocks, channels, carriers, subcarriers, etc.). In some cases, a first traffic flow to be provided on a particular link may be associated with a higher latency threshold (e.g., a less strict latency threshold) and/or a lower priority than a second traffic flow to be provided on the particular link. In such a case, a scheduling device and/or one or more of the transmission devices may schedule the second traffic flow to interrupt or puncture the first traffic flow, which may lead to erroneous decoding of the first traffic flow, loss of data of a portion of the first traffic flow, and/or the like. Techniques and apparatuses, described herein, provide the portion of the interrupted traffic flow and/or information associated with the portion of the interrupted traffic flow (e.g., control information) via a link other than the particular link associated with the interrupted traffic flow. In this way, techniques and apparatuses described herein improve reception and reduce data loss of the interrupted traffic flow, improve efficiency of obtaining information of the interrupted traffic flow, and improve efficiency of allocation of the network spectrum.

Figure 9:
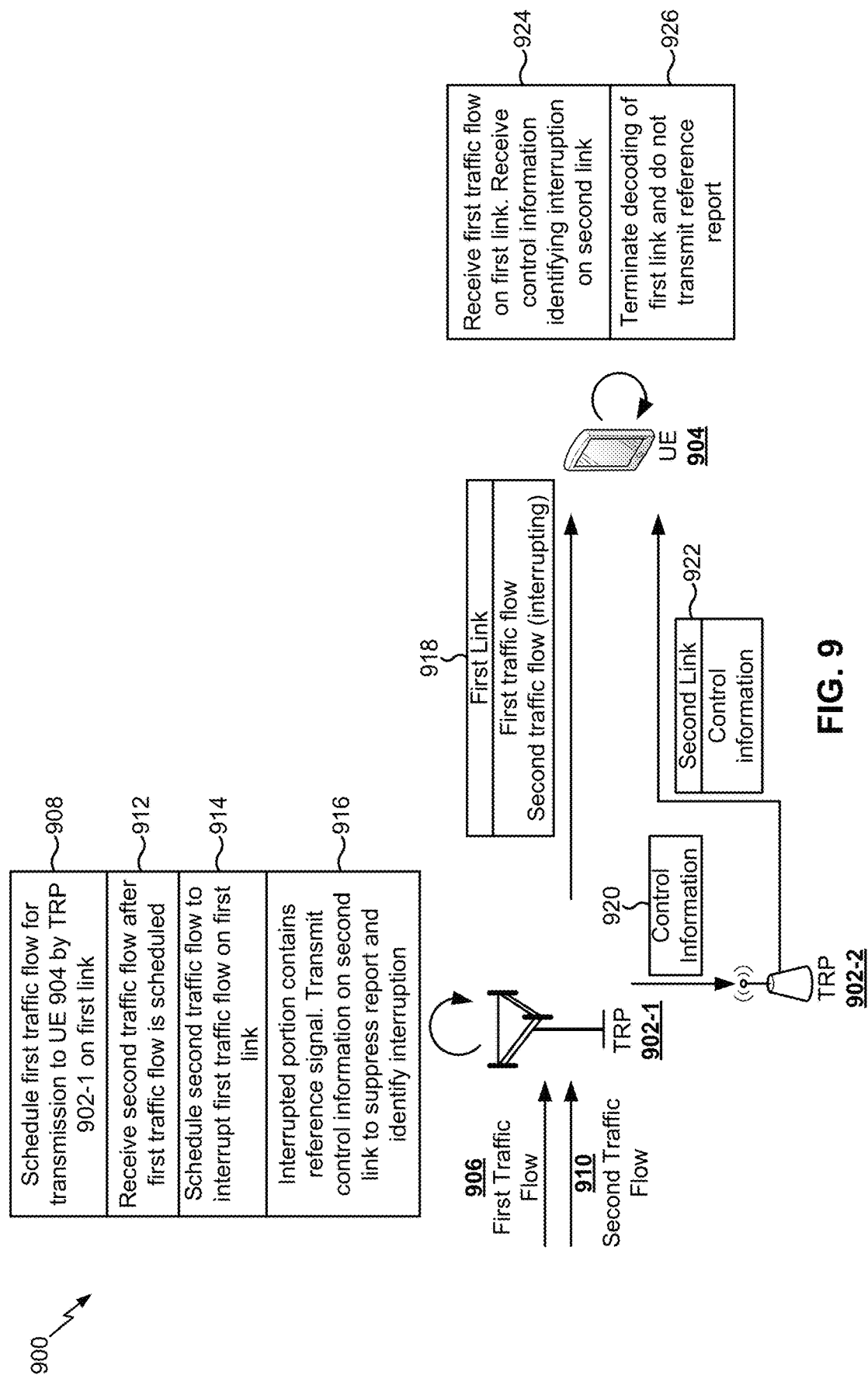
FIG. 9 is a diagram illustrating an example of complementary transmission relating to an interrupted traffic flow in New Radio.

FIG. 9 is a diagram illustrating an example 900 of complementary transmission relating to an interrupted traffic flow in New Radio. As shown, example 900 may include TRPs 902-1 and 902-2 (e.g., the BS 110 of FIG. 1, the TRPs 508 of FIG. 5, and/or another such device capable of transmitting a traffic flow) and a UE 904 (e.g., the UE 120 of FIG. 1 and/or another such device capable of communicating using two or more links).

As shown by reference number 906, the TRP 902-1 may receive a first traffic flow. The first traffic flow may include information to be transmitted to the UE 904. In some aspects, the TRP 902-1 may generate or determine the first traffic flow. As shown by reference number 908, the TRP 902-1 may schedule the first traffic flow for transmission to the UE 904 on a first link. For example, the first link may include a transport block, a carrier, a subcarrier, and/or the like. The TRP 902-1 (or a scheduling entity associated with the TRP 902-1) may allocate network resources corresponding to the first link (e.g., resource blocks (RBs), etc.) on which to transmit the first traffic flow to the UE 904.

As shown by reference number 910, the TRP 902-1 may receive a second traffic flow. In some aspects, the TRP 902-1 may generate or determine the first traffic flow. In some aspects, the second traffic flow may be associated with a lower latency (e.g., a lower latency threshold) and/or a higher priority than the first traffic flow. As shown by reference number 912, the TRP 902-1 may receive the second traffic flow after the TRP 902-1 has scheduled the first traffic flow for transmission to the UE 904. For example, the TRP 902-1 may receive the second traffic flow during transmission of the first traffic flow. As another example, the TRP 902-1 may receive the second traffic flow after the first traffic flow is scheduled and before the first traffic flow is transmitted.

As shown by reference number 914, the TRP 902-1 may schedule the second traffic flow to interrupt the first traffic flow on the first link. For example, the TRP 902-1 may allocate network resources to the second traffic flow that were formerly allocated to the first traffic flow, so that the second traffic flow interrupts a portion of the first traffic flow. In some aspects, the re-allocation of resources from the first traffic flow to the second traffic flow may be referred to as puncturing the first traffic flow.

As shown by reference number 916, the TRP 902-1 may obtain information indicating that the interrupted portion of the first traffic flow contains a reference signal. For example, the TRP 902-1 may transmit reference signals, such as a channel state information reference signal (CSI-RS), and/or the like. The UE 904 may generate a channel state feedback (CSF) report based at least in part on a strength or quality of the reference signal. When the TRP 902-1 is to transmit the reference signal in the interrupted portion of the first traffic flow, the reference signal may be associated with a higher level of noise or interference than when the TRP 902-1 is to transmit the reference signal in a non-interrupted part of the first traffic flow. Therefore, the TRP 902-1 may transmit control information indicating not to provide the CSF report, which may improve accuracy of CSF reporting and conserve resources of the UE 904 and/or conserve network resources.

As shown by reference number 918, the TRP 902-1 may transmit the first traffic flow to the UE 904 on the first link. As further shown, the TRP 902-1 may transmit the second traffic flow on the first link, which may lead to interruption of the first traffic flow by the second traffic flow. For a more detailed description of the first traffic flow and the second traffic flow, refer to FIGS. 10A and 10B, below.

As shown by reference number 920, the TRP 902-1 may provide control information to the TRP 902-2 for transmission on the second link. The control information may include information associated with the portion of the first traffic flow that is interrupted by the second traffic flow. In some aspects, the information associated with the portion of the first traffic flow may include the portion of the first traffic flow. In some aspects, the information associated with the portion of the first traffic flow may include a redundancy version of the first traffic flow, which may be different than a redundancy version of the first traffic flow that is to be provided via the second link. In some aspects, the TRP 902-1 may provide the information associated with the portion of the first traffic flow to the TRP 902-2 before the portion of the first traffic flow is interrupted by the second traffic flow, thereby enabling the TRP 902-2 to provide the information associated with the portion of the first traffic flow to the UE 904 before the first traffic flow is interrupted. This, in turn, may enable reconfiguration of the UE 904 based on the information associated with the portion of the first traffic flow, as described in more detail below. In some aspects, the TRP 902-1 may provide the information associated with the portion of the first traffic flow to the TRP 902-2 substantially at the same time the portion of the first traffic flow is interrupted by the second traffic flow, thereby enabling the TRP 902-2 to provide the information associated with the portion of the first traffic flow to the UE 904 at substantially the same time that the UE 904 would have received the portion of the first traffic flow had the first traffic flow not been interrupted. As shown by reference number 922, the TRP 902-2 may provide the control information (e.g., the information associated with the portion of the first traffic flow) to the UE 904.

As shown by reference number 924, the UE 904 may receive the first traffic flow on the first link. As further shown, the UE 904 may receive the control information (e.g., the information associated with the portion of the first traffic flow) on the second link. In some aspects, transmitters providing the first link and the second link may be associated with the same TRP 902.

As shown by reference number 926, the UE 904 may terminate decoding on the first link (e.g., decoding of the first traffic flow) based at least in part on the information associated with the portion of the first traffic flow. For example, the UE 904 may decode the first traffic flow to obtain information transmitted as part of the first traffic flow. When the first traffic flow is interrupted by the second traffic flow, the UE 904 may fail to decode part of, or all of, the first traffic flow. Therefore, by terminating the decoding on the first link, the UE 904 saves processor resources that would otherwise be used to erroneously decode the first traffic flow.

As further shown by reference number 926, the UE 904 may not transmit a reference message with regard to the portion of the first traffic flow based at least in part on the information associated with the portion of the first traffic flow. For example, the UE 904 may not transmit a channel state feedback report based at least in part on the information associated with the portion of the first traffic flow, which conserves uplink resources of the UE 904 and reduces erroneous reporting of channel state information that may be degraded by transmission of the second traffic flow.

In some aspects, the information associated with the portion of the first traffic flow may include additional and/or alternative information, as described in more detail in connection with FIGS. 10A and 10B, below. In some aspects, the UE 904 may selectively perform additional and/or alternative processing operations based at least in part on the information associated with the portion of the first traffic flow, as is also described in more detail in connection with FIGS. 10A and 10B, below.

As indicated above, FIG. 9 is provided as an example. Other examples are possible and may differ from what was described with respect to FIG. 9.

Figure 10B:
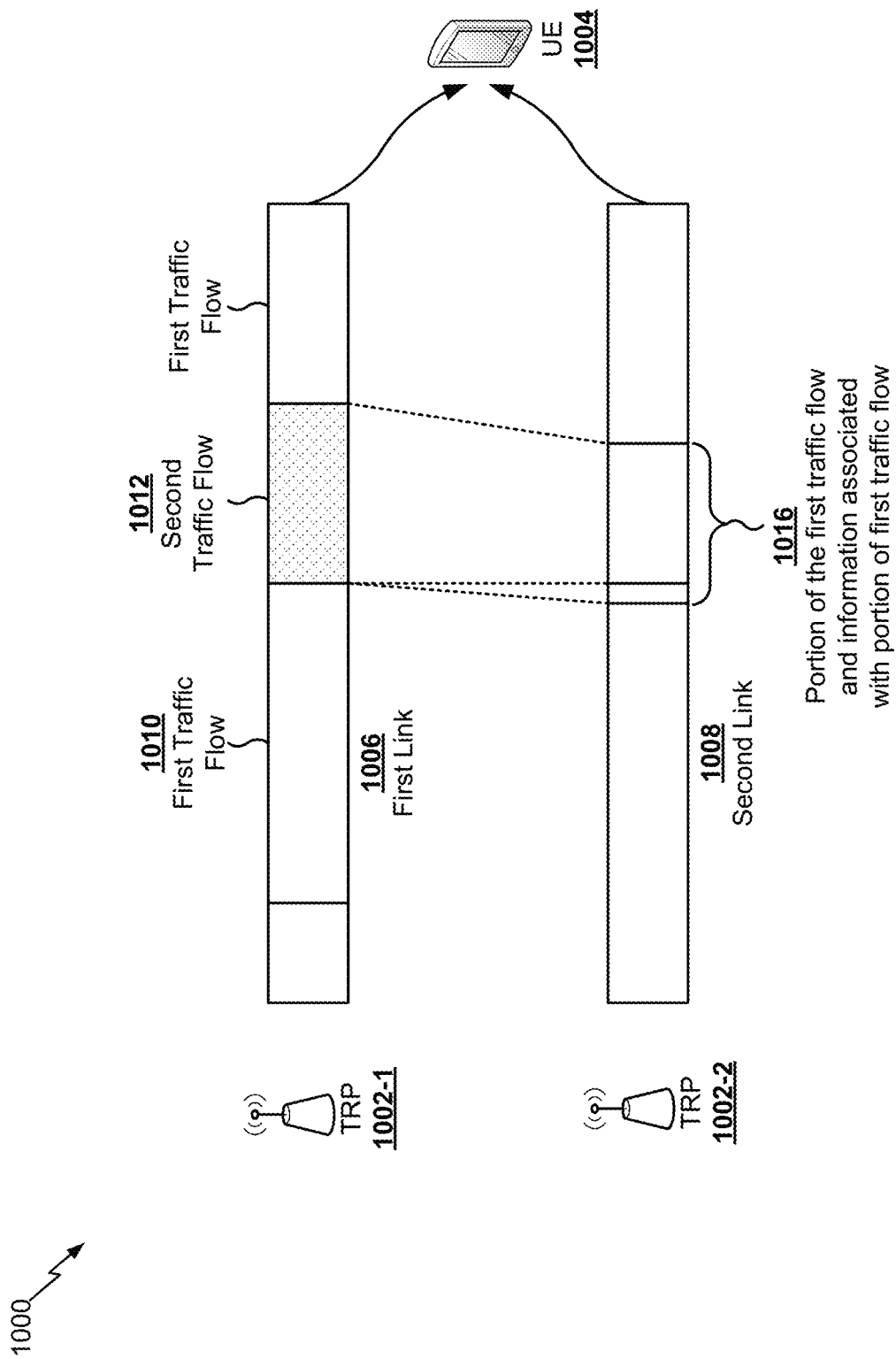

FIGS. 10A and 10B are diagrams illustrating examples 1000 of complementary transmission relating to an interrupted traffic flow in New Radio. As shown in FIGS. 10A and 10B, examples 1000 may include TRPs 1002-1 and 1002-2 (e.g., the BS 110 of FIG. 1, the TRPs 508 of FIG. 5, the TRPs 902-1 and 902-2 of FIG. 9, and/or another such device capable of transmitting a traffic flow) and a UE 1004 (e.g., the UE 120 of FIG. 1, the UE 904 of FIG. 9, and/or another such device capable of communicating using two or more links).

As shown in FIG. 10A, the TRP 1002-1 may provide a first link 1006, and the TRP 1002-2 may provide a second link 1008. The first link 1006 and the second link 1008 may include carriers, subcarriers, channels, and/or the like, within which traffic is to be provided to the UE 1004. For example, the first link may be associated with a different carrier or subcarrier than the second link. Additionally, or alternatively, the first link may be associated with a different radio access technology than the second link. For example, one or more of the first link or the second link may be associated with 3G, 4G, LTE, 5G, NR, WiFi, and/or the like. As further shown, a first traffic flow 1010 may be provided via the first link 1006, and a second traffic flow 1012 may interrupt a portion of the first traffic flow 1010 on the first link 1006.

In some aspects, the first link 1006 may be associated with a different subcarrier spacing, slot structure, or subframe structure than the second link 1008. Additionally, or alternatively, the first link 1006 may be associated with a narrower bandwidth than the second link 1008. In such a case, a control channel of the first link 1006 may occur less frequently than a control channel of the second link 1008 (e.g., based at least in part on respective transmission time intervals (TTIs) of the first link 1006 and the second link 1008). When the control channel of the first link 1006 occurs less frequently than the control channel of the second link 1008, it may be advantageous to provide the control information (e.g., information associated with the portion of the first traffic flow 1010) via the second link 1008. For example, the second traffic flow may be received by the TRP 1002-1 (or another scheduling entity) after the control channel of the first link 1006 occurs, and using the control channel of the second link 1008 to transmit the control information may permit reconfiguration of the UE 1004 before the first traffic flow 1010 is interrupted.

In some aspects, the first link 1006 may be associated with licensed spectrum, and the second link 1008 may be associated with shared or unlicensed spectrum. For example, the first link 1006 may be part of the New Radio spectrum, and the second link 1008 may be part of a shared or unlicensed spectrum, such as a WiFi spectrum, a mm wave spectrum, and/or the like. In some aspects, the first link 1006 may be an interruptible link (i.e., a link for providing traffic flows that may be interrupted by other traffic flows on the link or that may interrupt other traffic flows on the link), and the second link 1008 may be an uninterruptible link (e.g., a link for providing control information and/or data that is not to be interrupted by scheduling of other information or transmissions).

As shown by reference number 1014, the TRP 1002-2 may provide control information on the second link 1008. As further shown, the control information may include information associated with the portion of the first traffic flow.

In some aspects, the information associated with the portion of the first traffic flow (e.g., the control information 1014) may indicate that the UE 1004 is not to transmit HARQ feedback for the portion of the first traffic flow. For example, the HARQ feedback for the portion of the first traffic flow may indicate that the first traffic flow is corrupted or cannot be decoded, and may request retransmission of the first traffic flow or the portion of the first traffic flow. In such a case, the portion of the first traffic flow, or a redundancy version of the first traffic flow which includes the portion of the first traffic flow, may be provided via the second link 1008, which may render the HARQ function redundant. For this reason, transmitting the HARQ feedback may be wasteful of resources of the UE 1004. Therefore, by configuring the UE 1004 not to transmit the HARQ feedback, the UE 1004 conserves processor resources and uplink resources.

In some aspects, the TRP 1002-1 may determine that the interrupted portion of the first traffic flow is to include a beam management signal. For example, the UE 1004 may perform a beam management operation, such as beamshaping, beamforming, and/or the like. The UE 1004 may perform the beam management operation based at least in part on a beam management signal received by the UE 1004. When the beam management signal is to be transmitted or received in the interrupted portion of the first traffic flow, the TRP 1002-2 may transmit control information indicating that the UE 1004 is not to perform beam management. For example, the second traffic flow may impede or interfere with the beam management signal, which may lead to inaccurate beam management. By providing information indicating that the UE 1004 is not to perform beam management when the second traffic flow interrupts the first traffic flow, the TRP 1002 conserves processor resources of the UE 1004 and improves performance of beam management.

As shown in FIG. 10B, and by reference number 1016, in some aspects, the TRP 1002-2 may transmit the control information (e.g., the information associated with the portion of the traffic flow) and the portion of the first traffic flow on the second link 1008. By transmitting the portion of the first traffic flow on the second link 1008, the TRP 1002-2 enables the UE 1004 to obtain the portion of the first traffic flow without performing HARQ requests for the portion of the first traffic flow, scheduling retransmission of the first traffic flow, and/or the like. The UE 1004 may selectively perform processing to combine signals received in the first traffic flow via the first link (e.g., an uninterrupted portion of the first traffic flow) with signals received in the portion of the first traffic flow via the second link. Additionally, or alternatively, the UE 1004 may selectively perform processing to decode the portion of the first traffic flow as part of the first traffic flow. For example, the UE 1004 may use the same decoding process for the first link and the portion of the first traffic flow (e.g., when the first link and the portion of the first traffic flow are associated with the same modulation and coding scheme) or may use a different decoding process for the first link than for the portion of the first traffic flow on the second link (e.g., when the first link and the second link are associated with different modulation and coding schemes, etc.).

In some aspects, the information associated with the portion of the traffic flow may identify a control format to obtain the portion of the first traffic flow transmitted on the second link. For example, the information associated with the first traffic flow may identify a coding format indicator (CFI) (e.g., transmitted on a physical control format indicator channel (PCFICH) of the second link 1008). The UE 1004 may use the CFI to decode or process the portion of the first traffic flow.

In some aspects, the TRP 1002-2 may transmit a redundancy version of the first traffic flow 1010 via the second link 1008 that is different than a redundancy version that would be transmitted via the first link 1006. For example, the TRP 1002-2 may transmit information included in the first traffic flow 1010 via the second link 1008 based at least in part on obtaining information indicating that the portion of the first traffic flow is to be interrupted by the second traffic flow. The UE 1004 may obtain the portion of the first traffic flow, or an entirety of the first traffic flow, based at least in part on the information transmitted via the second link 1008.

In some aspects, the UE 1004 may selectively perform processing related to the first link 1006 based at least in part on a size of the portion of the first traffic flow. For example, when a size of the portion of the first traffic flow (e.g., a data quantity, a length, a number of subframes, etc.) satisfies a threshold, the UE 1004 may terminate decoding or processing of the first link 1006 (e.g., based at least in part on a reduced likelihood of success of decoding due to the interruption). Additionally, or alternatively, when the size of the portion of the first traffic flow does not satisfy the threshold, the UE 1004 may continue to decode or process the first link 1006.

In some aspects, the UE 1004 may selectively perform processing related to the first link 1006 based at least in part on whether the UE 1004 has started decoding the portion of the first traffic flow. For example, when the UE 1004 has started decoding the portion of the first traffic flow before the first traffic flow 1010 is interrupted or before the UE 1004 is notified that the first traffic flow 1010 will be interrupted, the UE 1004 may continue to decode the first traffic flow (e.g., using the received information associated with the portion of the first traffic flow). When the UE 1004 has not started decoding the portion of the first traffic flow, the UE 1004 may not start decoding the portion of the first traffic flow. For example, the UE 1004 may wait until the UE 1004 has received the information associated with the portion of the first traffic flow to start decoding the portion of the first traffic flow.

As indicated above, FIGS. 10A and 10B are provided as examples. Other examples are possible and may differ from what was described with respect to FIGS. 10A and 10B.

FIG. 11 is a flow chart of a process 1100 of wireless communication. The method may be performed by a transmission device (e.g., the BS 110 of FIG. 1, the UE 120 of FIG. 1, the TRPs 508 of FIG. 5, the TRPs 902 of FIG. 9, the TRPs 1002 of FIG. 10, and/or the like).

At 1102, the transmission device obtains information indicating that a portion of a first traffic flow to be transmitted on a first link is to be interrupted by a second traffic flow to be transmitted on the first link, the first traffic flow being scheduled for transmission before the information is obtained. In some aspects, the first link may be associated with a first transmission point and the second link may be associated with a second transmission point that is different than the first transmission point. As used herein, "transmission point" may refer to a TRP (e.g., the BS 110, UE 120, TRP 508, TRP 902, UE 904, TRP 1002, UE 1004, etc.), a transmitter of a TRP, or the like. In some aspects, the second traffic flow may have a shorter transmission time interval (TTI) than the first traffic flow. In some aspects, the second traffic flow may be associated with a lower latency requirement than the first traffic flow.

In some aspects, the first link may be associated with a different subcarrier spacing, slot structure, or subframe structure than the second link. In some aspects, the first link may be associated with licensed spectrum, and the second link may be associated with shared or unlicensed spectrum. In some aspects, the first link may be associated with a longer TTI than the second link. In some aspects, the first link may be associated with a first control channel that occurs less frequently than a second control channel associated with the second link. In some aspects, the first link may be associated with a narrower bandwidth than the second link. In some aspects, the first traffic flow may be associated with a lower priority than the second traffic flow.

In some aspects, the first link and the second link may be associated with a same carrier, and the first link and the second link may be associated with different transmission points of a base station. In some aspects, the first link and the second link may be associated with a same carrier, and the first link and the second link may be associated with different transmission points of different base stations. In some aspects, the first link may be associated with a different carrier than the second link. In some aspects, the first link may be associated with a different radio access technology than the second link.

At 1104, the transmission device may transmit information associated with the portion of the first traffic flow on a second link that is different than the first link. In some aspects, the information associated with the portion of the first traffic flow may include the portion of the first traffic flow, or control information for the portion of the first traffic flow, or any combination thereof. In some aspects, the information associated with the portion of the first traffic flow may identify a control format to obtain the portion of the first traffic flow transmitted on the second link. In some aspects, the information associated with the portion of the first traffic flow may include information indicating that the first traffic flow is to be interrupted by the second traffic flow.

In some aspects, the information associated with the portion of the first traffic flow may identify at least one of time resources or frequency resources of the portion of the first traffic flow that are interrupted by the second traffic flow. In some aspects, a redundant version of the first traffic flow may be provided via the second link.

In some aspects, the information associated with the portion of the first traffic flow may indicate whether to transmit hybrid automatic repeat request (HARQ) information for the portion of the first traffic flow. In some aspects, the portion of the first traffic flow may include a reference signal relating to the first link, and the information associated with the portion of the first traffic flow may indicate whether to transmit a report relating to the reference signal. In some aspects, the portion of the first traffic flow may include a beam management signal, and the information associated with the portion of the first traffic flow may indicate whether to perform beam management with regard to the beam management signal.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
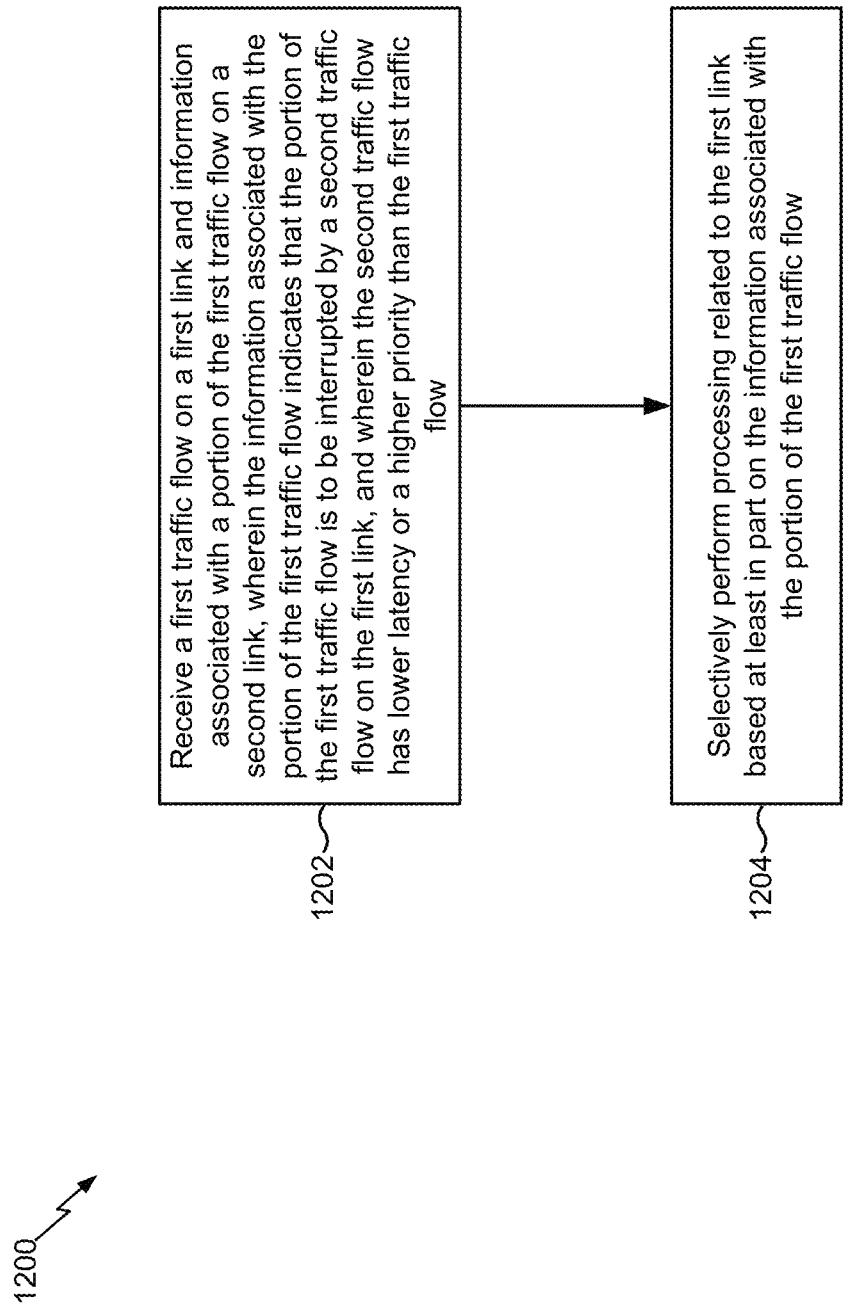
FIG. 12 is another flow chart of a method of wireless communication.

FIG. 12 is a flow chart of a process 1200 of wireless communication. The method may be performed by a receiver device (e.g., UE 120, UE 904, UE 1004, and/or the like).

At 1202, the receiver device receives a first traffic flow on a first link and information associated with a portion of the first traffic flow on a second link, wherein the information associated with the portion of the first traffic flow indicates that the portion of the first traffic flow is to be interrupted by a second traffic flow on the first link, and wherein the second traffic flow has lower latency or a higher priority than the first traffic flow. In some aspects, the information associated with the portion of the first traffic flow may include the portion of the first traffic flow, or control information for the portion of the first traffic flow, or any combination thereof. In some aspects, the second traffic flow may have a shorter TTI than the first traffic flow.

In some aspects, the portion of the first traffic flow may include a reference signal relating to the first traffic flow, and the information associated with the portion of the first traffic flow may indicate whether to transmit a report relating to the reference signal. In some aspects, the portion of the first traffic flow may include a beam management signal, and the information associated with the portion of the first traffic flow may indicate whether to transmit beam management information relating to the beam management signal. In some aspects, the information associated with the portion of the first traffic flow may indicate whether to transmit hybrid automatic repeat request (HARQ) information for the first link.

In some aspects, the first link and the second link may be associated with a same carrier, and the first link and the second link may be received by different antennas of the receiver device. In some aspects, the first link may be associated with a different carrier than the second link. In some aspects, the first link may be associated with a different radio access technology than the second link. In some aspects, the first link may be associated with a first transmission point and the second link may be associated with a second transmission point. In some aspects, the first link may be associated with a different subcarrier spacing, slot structure, or subframe structure than the second link.

At 1204, the receiver device selectively performs processing related to the first link based at least in part on the information associated with the portion of the first traffic flow. In some aspects, the receiver device may selectively perform processing to combine signals received in the first traffic flow via the first link with signals received in the portion of the first traffic flow via the second link. In some aspects, the receiver device may selectively perform processing to decode the portion of the first traffic flow as part of the first traffic flow. In some aspects, the receiver device may selectively perform processing to terminate decoding of the first traffic flow based at least in part on the information associated with the portion of the first traffic flow.

In some aspects, the receiver device may selectively perform processing related to the first link based at least in part on a size of the portion of the first traffic flow. In some aspects, the receiver device may selectively perform processing related to the first link based at least in part on whether the receiver device has started decoding the portion of the first traffic flow.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
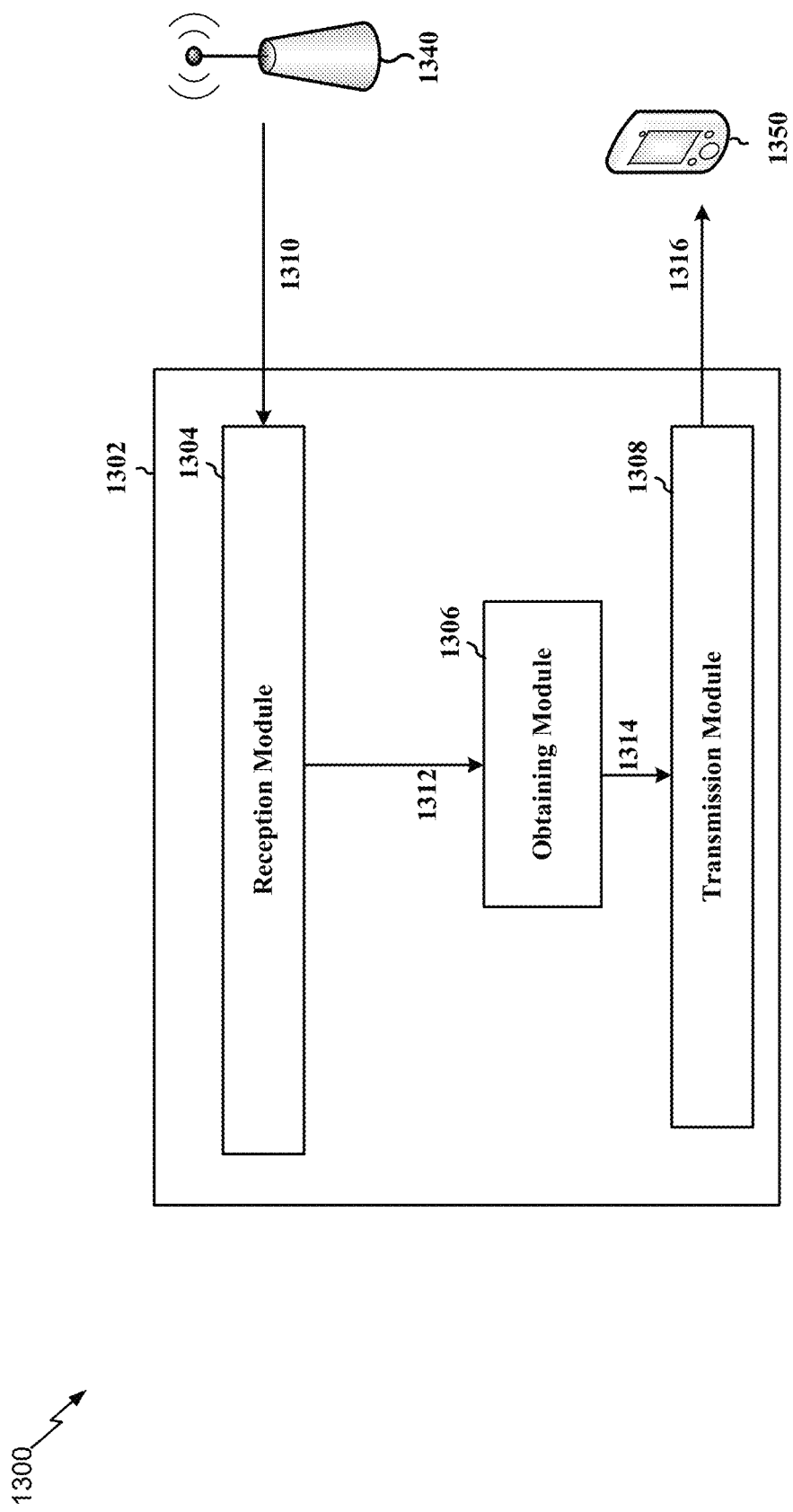
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a transmission device, such as the BS 110 or UE 120 of FIG. 1, the TRPs 508 of FIG. 5, the TRPs 902-1 and 902-2 or UE 904 of FIG. 9, the TRPs 1002-1 and 1002-2 or UE 1004 of FIG. 10, and/or the like. In some aspects, the apparatus 1302 includes a reception module 1304, an obtaining module 1306, and/or a transmission module 1308.

The reception module 1304 may receive data 1310 from, for example, a device 1340, which may correspond to the ANC 502, another apparatus 1302, and/or the like. The data 1310 may include, for example, a first traffic flow and/or a second traffic flow. The reception module 1304 may provide the data 1310, as data 1312, to the obtaining module 1306.

The obtaining module 1306 may receive the data 1312 (e.g., the first traffic flow and/or the second traffic flow), and may obtain information indicating that a portion of the first traffic flow to be transmitted on a first link is to be interrupted by a second traffic flow to be transmitted on the first link, the first traffic flow being scheduled for transmission before the information is obtained. The obtaining module 1306 may provide, to the transmission module 1308 as data 1314, information associated with the portion of the first traffic flow.

The transmission module 1308 may use the data 1314 to transmit information associated with the portion of the first traffic flow on a second link that is different than the first link. For example, the transmission module 1308 may transmit the information associated with the portion of the first traffic flow to a receiver device 1350 (e.g., UE 120, 904, 1004, and/or the like) as data 1316.

The apparatus may include additional modules that perform each of the blocks of the algorithm in the aforementioned flow chart of FIG. 11. As such, each block in the aforementioned flow chart of FIG. 11 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
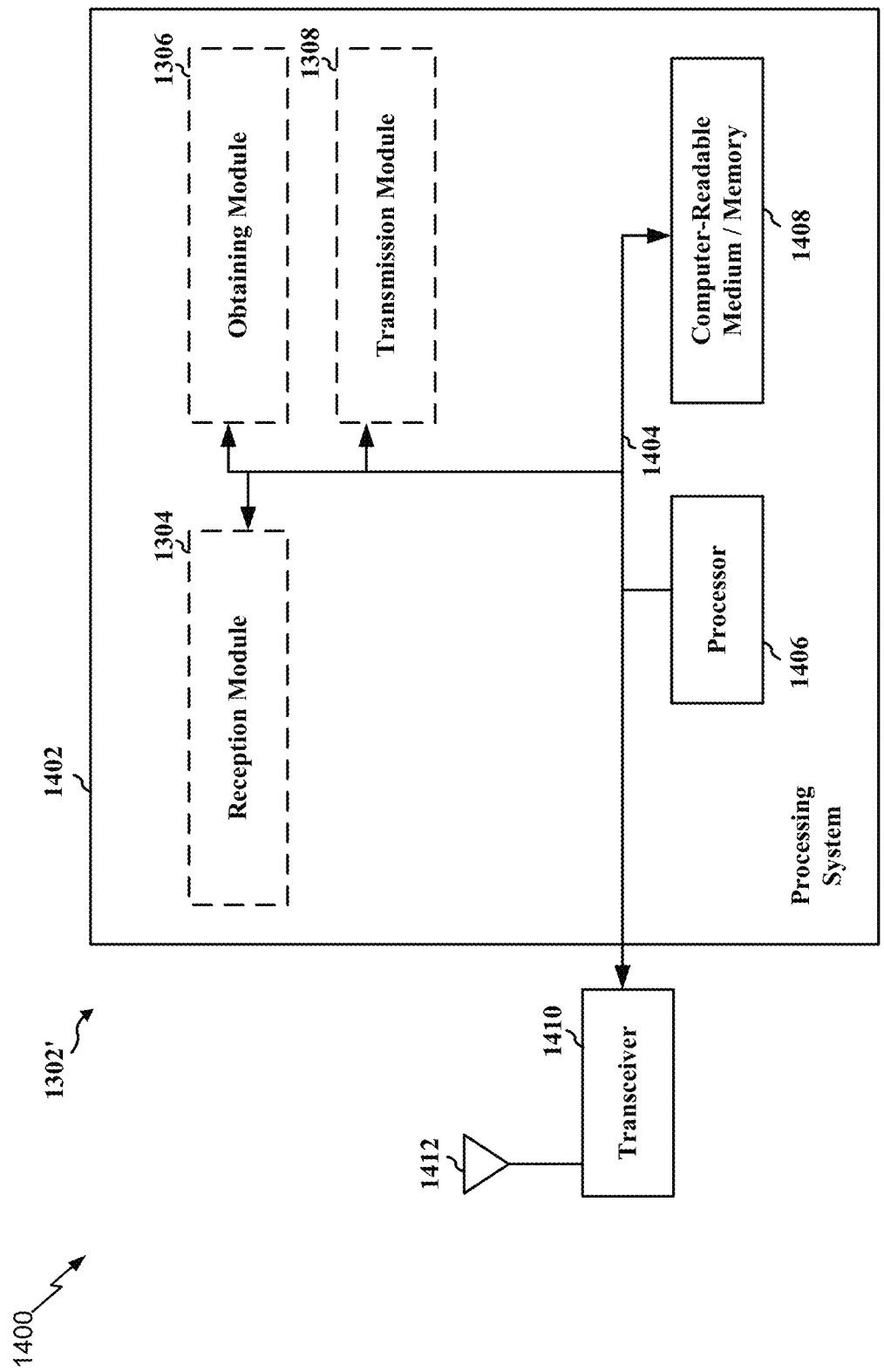
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a transmission device, such as the BS 110 or UE 120 of FIG. 1, the TRPs 508 of FIG. 5, the TRPs 902-1 and 902-2 or UE 904 of FIG. 9, the TRPs 1002-1 and 1002-2 or UE 1004 of FIG. 10, and/or the like.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1308, and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 also be used for storing data that is manipulated by the processor 1406 when executing software. The processing system further includes at least one of the modules 1304, 1306, 1308. The modules may be software modules running in the processor 1406, resident/stored in the computer-readable medium/memory 1408, one or more hardware modules coupled to the processor 1406, or some combination thereof. The processing system 1402 may be a component of the BS 110 and may include the memory 242 and/or at least one of the TX MIMO processor 230, the receive processor 238, and/or the controller/processor 240.

In some aspects, the apparatus 1302/1302' for wireless communication includes means for obtaining information indicating that a portion of a first traffic flow to be transmitted on a first link is to be interrupted by a second traffic flow to be transmitted on the first link, the first traffic flow being scheduled for transmission before the information is obtained, means for transmitting information associated with the portion of the first traffic flow on a second link that is different than the first link, and/or the like. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 14 is provided as an example. Other examples are possible and may differ from what was described in connection with FIG. 14.

Figure 15:
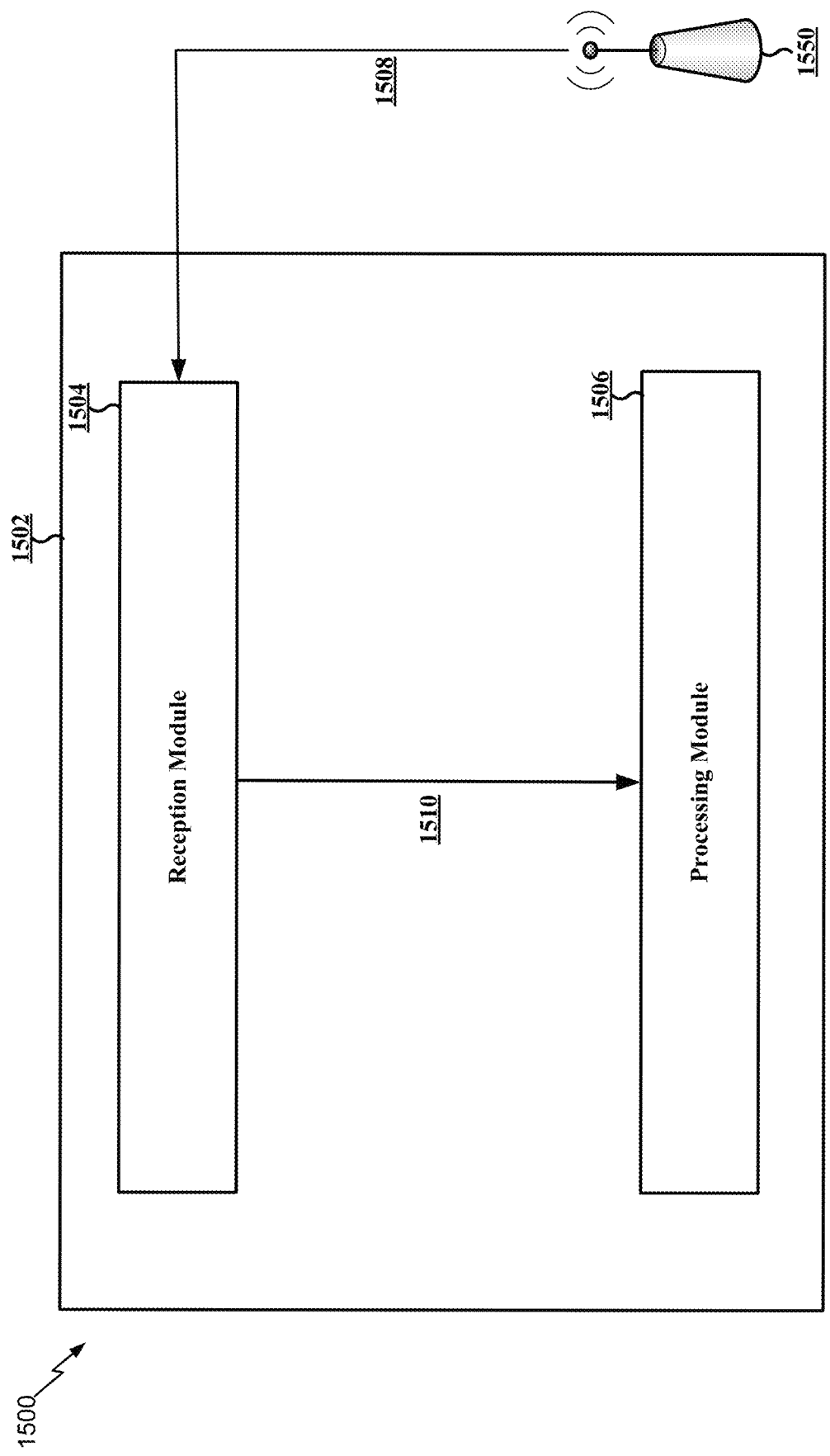
FIG. 15 is a conceptual data flow diagram illustrating the data flow between different modules/means/components in an example apparatus.

FIG. 15 is a conceptual data flow diagram 1500 illustrating the data flow between different modules/means/components in an example apparatus 1502. The apparatus 1502 may be a receiver device, such as the UE 120, the UE 904, the UE 1004, and/or the like. In some aspects, the apparatus 1502 includes a reception module 1504 and/or a processing module 1506.

The reception module 1504 may receive data 1508 from, for example, a transmission device 1550, which may correspond to the BS 110 of FIG. 1, the TRPs 508 of FIG. 5, the TRPs 902-1 and 902-2 of FIG. 9, the TRPs 1002-1 and 1002-2 of FIG. 10, and/or the like. The data 1508 may include, for example, a first traffic flow on a first link and information associated with a portion of the first traffic flow on a second link, wherein the information associated with the portion of the traffic flow indicates that the portion of the first traffic flow is to be interrupted by a second traffic flow on the first link, and wherein the second traffic flow has lower latency or a higher priority than the first traffic flow. The reception module 1504 may provide the data 1508, as data 1510, to the processing module 1506.

The processing module 1506 may receive the data 1510 (e.g., the first traffic flow and the information associated with the portion of the second traffic flow), and may selectively perform processing related to the first link based at least in part on the information associated with the portion of the first traffic flow.

The apparatus may include additional modules that perform each of the blocks of the algorithm in the aforementioned flow chart of FIG. 12. As such, each block in the aforementioned flow chart of FIG. 12 may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 15 are provided as an example. In practice, there may be additional modules, fewer modules, different modules, or differently arranged modules than those shown in FIG. 15. Furthermore, two or more modules shown in FIG. 15 may be implemented within a single module, or a single module shown in FIG. 15 may be implemented as multiple, distributed modules. Additionally, or alternatively, a set of modules (e.g., one or more modules) shown in FIG. 15 may perform one or more functions described as being performed by another set of modules shown in FIG. 15.

Figure 16:
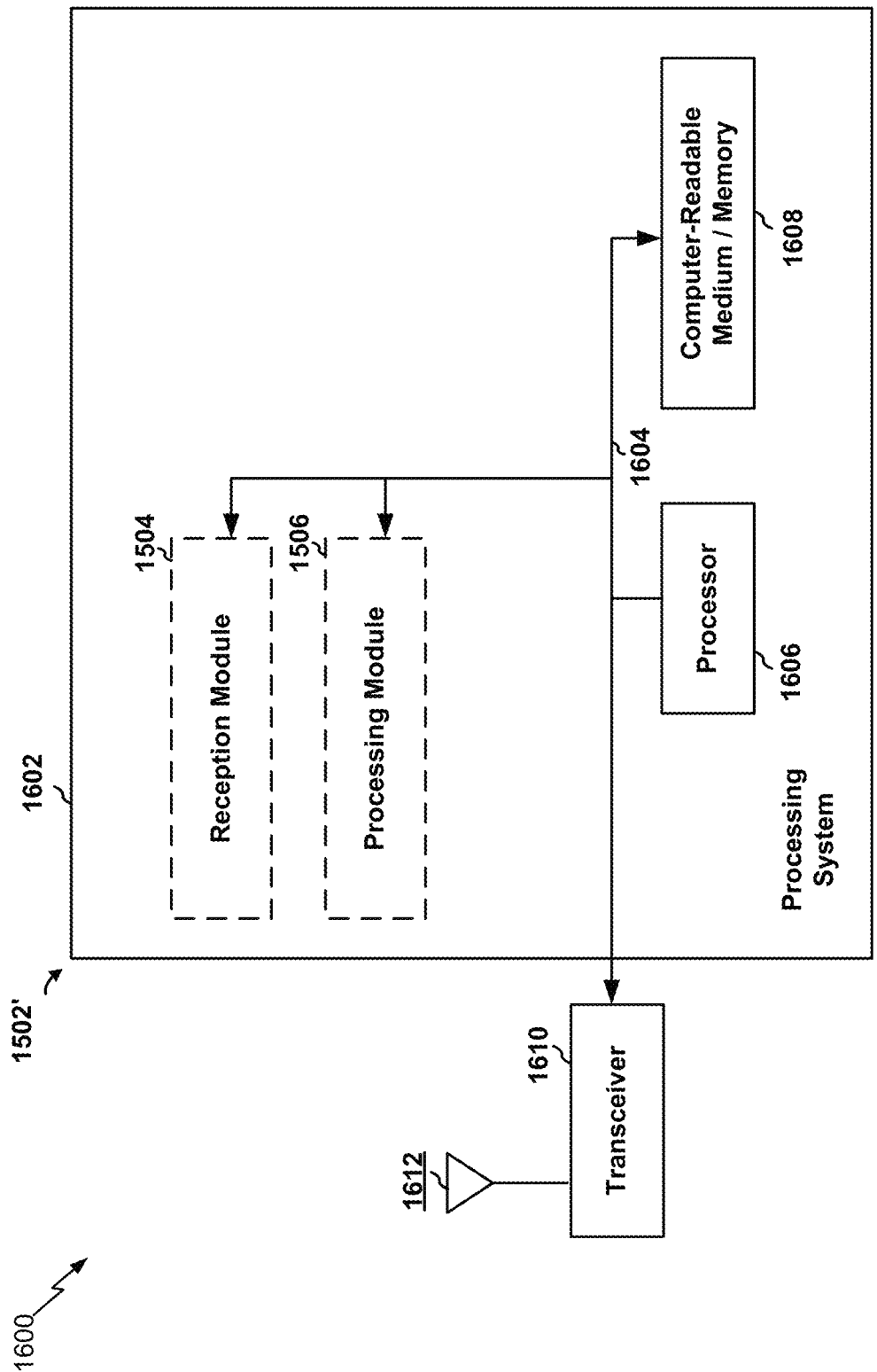
FIG. 16 is a diagram illustrating an example of a hardware implementation for an apparatus employing a processing system.

FIG. 16 is a diagram 1600 illustrating an example of a hardware implementation for an apparatus 1502' employing a processing system 1602. The apparatus 1502' may be a receiver device, such as the UE 120, the UE 904, the UE 1004, and/or the like.

The processing system 1602 may be implemented with a bus architecture, represented generally by the bus 1604. The bus 1604 may include any number of interconnecting buses and bridges depending on the specific application of the processing system 1602 and the overall design constraints. The bus 1604 links together various circuits including one or more processors and/or hardware modules, represented by the processor 1606, the modules 1504, 1506, and the computer-readable medium/memory 1608. The bus 1604 may also link various other circuits such as timing sources, peripherals, voltage regulators, and power management circuits, which are well known in the art, and therefore, will not be described any further.

The processing system 1602 may be coupled to a transceiver 1610. The transceiver 1610 is coupled to one or more antennas 1612. The transceiver 1610 provides a means for communicating with various other apparatus over a transmission medium. The transceiver 1610 receives a signal from the one or more antennas 1612, extracts information from the received signal, and provides the extracted information to the processing system 1602, specifically the reception module 1504. In addition, the transceiver 1610 receives information from the processing system 1602, specifically a transmission module (not shown), and based at least in part on the received information, generates a signal to be applied to the one or more antennas 1612. The processing system 1602 includes a processor 1606 coupled to a computer-readable medium/memory 1608. The processor 1606 is responsible for general processing, including the execution of software stored on the computer-readable medium/memory 1608. The software, when executed by the processor 1606, causes the processing system 1602 to perform the various functions described supra for any particular apparatus. The computer-readable medium/memory 1608 also be used for storing data that is manipulated by the processor 1606 when executing software. The processing system further includes at least one of the modules 1504, 1506. The modules may be software modules running in the processor 1606, resident/stored in the computer-readable medium/memory 1608, one or more hardware modules coupled to the processor 1606, or some combination thereof. The processing system 1602 may be a component of the UE 120 and may include the memory 282 and/or at least one of the TX MIMO processor 266, the receive processor 258, and/or the controller/processor 280.

In some aspects, the apparatus 1502/1502' for wireless communication includes means for receiving a first traffic flow on a first link and information associated with a portion of the first traffic flow on a second link, means for selectively performing processing related to the first link based at least in part on the information associated with the portion of the first traffic flow, means for selectively performing processing to combine signals received in the first traffic flow via the first link with signals received in the portion of the first traffic flow via the second link, means for selectively performing processing to decode the portion of the first traffic flow as part of the first traffic flow, means for selectively performing processing to terminate decoding of the first traffic flow based at least in part on the information associated with the portion of the first traffic flow, and/or means for selectively performing processing related to the first link based at least in part on a size of the portion of the first traffic flow. The aforementioned means may be one or more of the aforementioned modules of the apparatus 1502 and/or the processing system 1602 of the apparatus 1502' configured to perform the functions recited by the aforementioned means. As described supra, the processing system 1602 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 16 is provided as an example. Other examples are possible and may differ from what was described in connection with FIG. 16.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   obtaining information, by a transmission device, indicating that a portion of a first traffic flow to be transmitted on a first link is to be interrupted by a second traffic flow to be transmitted on the first link, the first traffic flow being scheduled for transmission before the information is obtained; and
   transmitting, by the transmission device, control information associated with the portion of the first traffic flow on a second link that is different than the first link.

2. The method of claim 1, wherein the control information associated with the portion of the first traffic flow comprises the portion of the first traffic flow and control information for the portion of the first traffic flow.

3. The method of claim 1, wherein the control information associated with the portion of the first traffic flow identifies a control format to obtain the portion of the first traffic flow transmitted on the second link.

4. The method of claim 1, wherein the first link is associated with a first transmission point and the second link is associated with a second transmission point that is different than the first transmission point.

5. The method of claim 1, wherein the second traffic flow has a shorter transmission time interval (TTI) than the first traffic flow.

6. The method of claim 1, wherein the second traffic flow is associated with a lower latency requirement than the first traffic flow.

7. The method of claim 1, wherein the first link is associated with a different subcarrier spacing, slot structure, or subframe structure than the second link.

8. The method of claim 1, wherein the first link is associated with licensed spectrum; and
   wherein the second link is associated with shared or unlicensed spectrum.

9. The method of claim 1, wherein the first link is associated with a first control channel that occurs less frequently than a second control channel associated with the second link.

10. The method of claim 1, wherein the first traffic flow is associated with a lower priority than the second traffic flow.

11. The method of claim 1, wherein the control information associated with the portion of the first traffic flow includes information indicating that the first traffic flow is to be interrupted by the second traffic flow.

12. The method of claim 1, wherein the control information associated with the portion of the first traffic flow identifies at least one of time resources or frequency resources of the portion of the first traffic flow that are interrupted by the second traffic flow.

13. The method of claim 1, wherein a different redundancy version of the first traffic flow, than would have been provided via the first link, is provided via the second link.

14. The method of claim 1, wherein the control information associated with the portion of the first traffic flow indicates whether to transmit hybrid automatic repeat request (HARQ) feedback for the portion of the first traffic flow.

15. The method of claim 1, wherein the portion of the first traffic flow is to include a reference signal or beam management signal relating to the first link; and
   wherein the control information associated with the portion of the first traffic flow indicates whether to transmit a channel state information (CSI) report or perform beam management relating to the reference signal or beam management signal.

16. The method of claim 1, wherein the first link and the second link are associated with a same carrier,
   wherein the first link and the second link are associated with at least one of:
      different transmission points of a base station, or
      different transmission points of different base stations.

17. The method of claim 1, wherein the first link is associated with a different carrier than the second link.

18. The method of claim 1, wherein the first link is associated with a different radio access technology than the second link.

19. An apparatus for wireless communication, comprising:
   a memory; and
   at least one processor coupled to the memory, the memory and the at least one processor configured to:
      obtain information indicating that a portion of a first traffic flow to be transmitted on a first link is to be interrupted by a second traffic flow to be transmitted on the first link, the first traffic flow being scheduled for transmission before the information is obtained; and
      transmit control information associated with the portion of the first traffic flow on a second link that is different than the first link.

20. A method of wireless communication, comprising:
   receiving, by a receiver device, a first traffic flow on a first link and control information associated with a portion of the first traffic flow on a second link, wherein the control information associated with the portion of the first traffic flow indicates that the portion of the first traffic flow is to be interrupted by a second traffic flow on the first link, and wherein the second traffic flow has lower latency or a higher priority than the first traffic flow; and selectively performing, by the receiver device, processing related to the first link based at least in part on the control information associated with the portion of the first traffic flow.

21. The method of claim 20, wherein the control information associated with the portion of the first traffic flow comprises the portion of the first traffic flow and control information for the portion of the first traffic flow.

22. The method of claim 21, wherein selectively performing processing related to the first link comprises selectively performing at least one of:

processing to decode the portion of the first traffic flow as part of the first traffic flow, processing to combine signals received in the first traffic flow via the first link with signals received in the portion of the first traffic flow via the second link, processing to terminate decoding of the first traffic flow based at least in part on the information associated with the portion of the first traffic flow, processing related to the first link based at least in part on a size of the portion of the first traffic flow, or processing related to the first link based at least in part on whether the receiver device has started decoding the portion of the first traffic flow.

23. The method of claim 20, wherein the second traffic flow has a shorter transmission time interval (TTI) than the first traffic flow.

24. The method of claim 20, wherein selectively performing processing related to the first link comprises selectively performing processing related to the first link based at least in part on whether the receiver device has started decoding the portion of the first traffic flow.

25. The method of claim 20, wherein the portion of the first traffic flow is to include a reference signal or a beam management signal relating to the first traffic flow; and wherein the control information associated with the portion of the first traffic flow indicates whether to transmit a channel state information (CSI) report or beam management information relating to the reference signal or the beam management signal.

26. The method of claim 20, wherein the control information associated with the portion of the first traffic flow indicates whether to transmit hybrid automatic repeat request (HARQ) feedback for the first link.

27. The method of claim 20, wherein the first link and the second link are associated with a same carrier, wherein the first link and the second link are received by different antennas of the receiver device.

28. The method of claim 20, wherein the first link is associated with a first transmission point and the second link is associated with a second transmission point.

29. The method of claim 20, wherein the first link is associated with a different subcarrier spacing, slot structure, or subframe structure than the second link.

30. An apparatus for wireless communication, comprising:

a memory; and at least one processor coupled to the memory, the memory and the at least one processor configured to:

receive a first traffic flow on a first link and control information associated with a portion of the first traffic flow on a second link, wherein the control information associated with the portion of the first traffic flow indicates that the portion of the first traffic flow is to be interrupted by a second traffic flow on the first link, and wherein the second traffic flow has lower latency or a higher priority than the first traffic flow; and selectively perform processing related to the first link based at least in part on the control information associated with the portion of the first traffic flow.

* * * * *